US012312126B2

(12) United States Patent
Cai et al.

(10) Patent No.: US 12,312,126 B2
(45) Date of Patent: May 27, 2025

(54) STACKED TOOLBOX SYSTEM

(71) Applicant: Meridian International Co., Ltd, Shanghai (CN)

(72) Inventors: Shujun Cai, Shanghai (CN); Hongquan Zhang, Shanghai (CN)

(73) Assignee: Meridian International Co., Ltd, Shanghai (CN)

( * ) Notice: Subject to any disclaimer, the term of this patent is extended or adjusted under 35 U.S.C. 154(b) by 138 days.

(21) Appl. No.: 17/956,459

(22) Filed: Sep. 29, 2022

(65) Prior Publication Data

US 2023/0136626 A1 May 4, 2023

(30) Foreign Application Priority Data

Nov. 3, 2021 (CN) ......................... 202122677703.6
Mar. 4, 2022 (CN) ......................... 202210212005.5
Mar. 4, 2022 (CN) ......................... 202210212862.5
May 27, 2022 (CN) ......................... 202210588703.5

(51) Int. Cl.
*B65D 21/02* (2006.01)
*B25H 3/02* (2006.01)

(52) U.S. Cl.
CPC ........... *B65D 21/0228* (2013.01); *B25H 3/02* (2013.01)

(58) Field of Classification Search
CPC ............ B65D 21/0223; B65D 21/0228; B65D 21/0219; B65D 21/0217; B65D 21/0209; B65D 21/0213; B65D 21/0224; B65D 21/0212; B65D 2543/00027; B65D 21/0215; B65D 21/02; B65D 21/023; B25H 3/023; B25H 3/021; B25H 3/02; B25H 3/026; B25H 3/028
(Continued)

(56) References Cited

U.S. PATENT DOCUMENTS 3,237,800 A * 3/1966 Edwards ............ B65D 43/0212 206/508
3,376,046 A * 4/1968 Kivett ....................... B62B 1/10 206/508

(Continued)

FOREIGN PATENT DOCUMENTS

CN 203427004 U 2/2014
CN 206841966 U 1/2018

(Continued)

OTHER PUBLICATIONS

Boschtools.com "L-boxx" products, Model #: L-BOXX-1, L-BOXX-2, L-BOXX-3, L-BOXX-4, http://www.boschtools.com/Products/Tools/Pages/Item Results.aspx?catid=1 611, Date unknown but prior to U.S. filing date.

(Continued)

*Primary Examiner* — Steven A. Reynolds
*Assistant Examiner* — Prince Pal
(74) *Attorney, Agent, or Firm* — Eversheds Sutherland (US), LLP

(57) ABSTRACT

A first locking mechanism disposed between two spaced apart second locking mechanisms for being set opposite to any one of said second locking mechanisms to form a first locking gap in a first direction between two spaced apart said second locking mechanisms being able to form a second locking gap in a first direction.

24 Claims, 19 Drawing Sheets

(58) Field of Classification Search
USPC ....... 206/499, 501, 503, 508, 509, 510, 511, 206/512, 1.5
See application file for complete search history.

(56) References Cited

U.S. PATENT DOCUMENTS

| | | | | |
|---|---|---|---|---|
| 3,648,849 | A | 3/1972 | Harris | |
| 3,828,899 | A * | 8/1974 | Scott | E05B 65/5292 292/DIG. 48 |
| 3,939,982 | A * | 2/1976 | Russell | B65D 25/04 220/23.88 |
| 3,980,185 | A * | 9/1976 | Cain | B65D 88/022 206/509 |
| 4,405,057 | A * | 9/1983 | Stein | B65D 55/14 206/508 |
| 4,619,363 | A | 10/1986 | Wolfseder | |
| 4,736,861 | A * | 4/1988 | Basili | G11B 23/027 |
| 4,813,542 | A * | 3/1989 | Thompson | B65D 21/02 206/508 |
| 5,011,013 | A | 4/1991 | Meisner et al. | |
| 5,197,601 | A * | 3/1993 | Sterett | B65D 11/06 206/509 |
| 5,464,115 | A * | 11/1995 | Tisbo | A45C 13/34 206/508 |
| 5,518,139 | A * | 5/1996 | Trower | A45C 11/20 206/379 |
| 5,617,967 | A * | 4/1997 | Neidhart | B65D 19/40 220/636 |
| 6,082,539 | A * | 7/2000 | Lee | B25H 3/021 206/821 |
| 6,193,062 | B1 | 2/2001 | Rysgaard et al. | |
| 6,328,355 | B1 * | 12/2001 | Bortz | G09F 3/0323 292/307 R |
| 6,371,320 | B2 | 4/2002 | Sagol | |
| 6,761,366 | B1 | 7/2004 | Klemmensen et al. | |
| 6,874,634 | B2 * | 4/2005 | Riley | A61B 50/30 206/439 |
| 6,889,838 | B2 | 4/2005 | Meier et al. | |
| 6,983,946 | B2 * | 1/2006 | Sullivan | B65D 25/2841 220/4.27 |
| 7,780,026 | B1 * | 8/2010 | Zuckerman | B65D 21/0223 206/508 |
| D630,435 | S | 1/2011 | Brunner | |
| 8,567,796 | B2 * | 10/2013 | Bar-Erez | B62B 1/04 280/47.26 |
| 8,573,399 | B2 * | 11/2013 | Ulmer | B65D 43/0206 206/508 |
| 8,602,217 | B2 * | 12/2013 | Sosnovsky | B65D 21/0228 220/756 |
| 8,851,287 | B2 * | 10/2014 | Becklin | B65D 21/0224 108/55.3 |
| 8,875,888 | B2 * | 11/2014 | Koenig | B65D 21/0223 206/508 |
| 8,936,258 | B2 | 1/2015 | Bar-Erez et al. | |
| 9,132,543 | B2 * | 9/2015 | Bar-Erez | B62B 1/04 |
| 9,277,796 | B1 * | 3/2016 | Elam | A45C 9/00 |
| 9,393,684 | B2 * | 7/2016 | Christopher | B25H 3/02 |
| 9,550,605 | B1 * | 1/2017 | Summers | B62B 3/004 |
| 9,566,990 | B2 | 2/2017 | Bar-Erez et al. | |
| 9,643,629 | B2 | 5/2017 | Bar-Erez et al. | |
| 9,725,209 | B1 * | 8/2017 | Ben-Gigi | B25H 3/021 |
| RE47,022 | E * | 9/2018 | Sosnovsky | B65D 45/22 |
| 10,093,445 | B1 * | 10/2018 | Hertz | B65D 21/0223 |
| 10,106,180 | B2 | 10/2018 | Bar-Erez et al. | |
| 10,434,638 | B1 * | 10/2019 | Tsai | B65D 21/0223 |
| 10,583,962 | B2 * | 3/2020 | Brunner | B25H 1/04 |
| 10,603,783 | B2 * | 3/2020 | Brocket | B25H 3/02 |
| 10,703,534 | B2 | 7/2020 | Brunner et al. | |
| 10,793,172 | B2 | 10/2020 | Brunner | |
| 10,870,513 | B2 * | 12/2020 | Gonitianer | B65D 21/0228 |
| 10,981,696 | B2 | 4/2021 | Brunner et al. | |
| 11,008,136 | B2 | 5/2021 | Brunner et al. | |
| 11,027,883 | B1 | 6/2021 | Brunner et al. | |
| 11,059,631 | B1 * | 7/2021 | Brunner | B65D 21/0217 |
| 11,066,089 | B2 | 7/2021 | Brunner | |
| 11,155,382 | B1 * | 10/2021 | Cai | B65D 21/0223 |
| 11,192,689 | B2 * | 12/2021 | Cai | B65D 67/02 |
| 11,192,690 | B1 | 12/2021 | Brunner et al. | |
| 11,230,410 | B2 * | 1/2022 | Brunner | B25H 3/02 |
| 11,459,008 | B2 | 10/2022 | Brunner et al. | |
| 11,642,777 | B2 * | 5/2023 | Baruch | B25H 3/022 403/322.4 |
| 11,643,252 | B2 * | 5/2023 | Barabeisch | B65D 25/2841 206/508 |
| 11,858,687 | B2 * | 1/2024 | Barabeisch | B65D 25/2858 |
| 11,986,946 | B2 * | 5/2024 | Zhang | B25H 3/026 |
| 2002/0000440 | A1 * | 1/2002 | Sagol | B25H 3/00 220/23.6 |
| 2003/0062365 | A1 | 4/2003 | Krueger | |
| 2003/0094392 | A1 * | 5/2003 | Meier | B65D 21/0213 206/503 |
| 2004/0144670 | A1 * | 7/2004 | Riley | A61B 50/30 206/439 |
| 2005/0150892 | A1 * | 7/2005 | Miller | B65D 19/18 220/324 |
| 2007/0012694 | A1 * | 1/2007 | Duvigneau | B25H 3/026 220/4.27 |
| 2007/0080089 | A1 * | 4/2007 | Anschutz | B65D 21/0201 206/509 |
| 2007/0194543 | A1 * | 8/2007 | Duvigneau | B25H 3/026 280/47.26 |
| 2008/0121547 | A1 | 5/2008 | Dur et al. | |
| 2009/0178946 | A1 * | 7/2009 | Patstone | B65D 21/0223 206/509 |
| 2010/0219193 | A1 * | 9/2010 | Becklin | B65D 21/0224 220/630 |
| 2010/0224528 | A1 * | 9/2010 | Madsen | B65D 21/0217 206/505 |
| 2011/0049824 | A1 * | 3/2011 | Bar-Erez | B25H 3/028 280/47.26 |
| 2011/0139665 | A1 | 6/2011 | Madsen | |
| 2011/0139666 | A1 * | 6/2011 | Sosnovsky | B25H 3/021 206/508 |
| 2011/0139777 | A1 * | 6/2011 | Sosnovsky | B65D 45/22 220/23.83 |
| 2011/0155613 | A1 * | 6/2011 | Koenig | B65D 21/0223 206/503 |
| 2011/0168599 | A1 * | 7/2011 | Koenig | B65D 45/20 206/509 |
| 2012/0024739 | A1 * | 2/2012 | Fjelland | F16B 45/036 403/321 |
| 2012/0080432 | A1 * | 4/2012 | Bensman | B25H 3/023 220/752 |
| 2012/0312812 | A1 * | 12/2012 | Sosnovsky | B65D 45/22 220/23.83 |
| 2012/0326406 | A1 * | 12/2012 | Lifshitz | B25H 3/02 206/503 |
| 2014/0069832 | A1 * | 3/2014 | Roehm | B65D 69/00 206/349 |
| 2015/0274362 | A1 * | 10/2015 | Christopher | B65D 21/0219 206/506 |
| 2016/0075479 | A1 * | 3/2016 | Finke | B65D 21/045 206/459.5 |
| 2016/0130034 | A1 * | 5/2016 | Kuhls | B65D 21/023 206/510 |
| 2016/0144500 | A1 * | 5/2016 | Chen | B65D 21/023 206/349 |
| 2016/0168880 | A1 * | 6/2016 | Phelan | B65D 55/14 206/1.5 |
| 2016/0236592 | A1 * | 8/2016 | Peniche | F16B 2/22 |
| 2017/0121056 | A1 * | 5/2017 | Wang | B65D 21/0228 |
| 2017/0129645 | A1 * | 5/2017 | Chang | B65D 21/0209 |
| 2017/0151972 | A1 | 6/2017 | Bar-Erez et al. | |
| 2017/0165828 | A1 * | 6/2017 | Fleischmann | B65D 85/00 |
| 2018/0213934 | A1 * | 8/2018 | Wolle | E05B 65/46 |
| 2018/0220758 | A1 * | 8/2018 | Burchia | B25H 3/02 |
| 2019/0002004 | A1 * | 1/2019 | Brunner | B25H 3/023 |
| 2019/0039781 | A1 * | 2/2019 | Kögel | B65D 21/0212 |
| 2019/0168376 | A1 * | 6/2019 | Brocket | B25H 3/021 |
| 2019/0291922 | A1 * | 9/2019 | Gonitianer | B65D 21/0228 |

(56) References Cited

U.S. PATENT DOCUMENTS

| | | | | |
|---|---|---|---|---|
| 2019/0308772 | A1* | 10/2019 | Gonitianer | B25H 3/02 |
| 2019/0315515 | A1 | 10/2019 | Gonitianer et al. | |
| 2020/0025229 | A1* | 1/2020 | Baruch | F16B 5/0635 |
| 2020/0346819 | A1* | 11/2020 | Kögel | B25H 3/02 |
| 2021/0155373 | A1* | 5/2021 | Cai | B65D 21/0212 |
| 2021/0221561 | A1* | 7/2021 | Davidian | B65D 21/0223 |
| 2022/0033140 | A1* | 2/2022 | Barabeisch | B25H 3/02 |
| 2022/0041336 | A1* | 2/2022 | Barabeisch | B65D 25/2858 |
| 2023/0027343 | A1* | 1/2023 | Zheng | B65D 21/0228 |
| 2023/0136626 | A1* | 5/2023 | Cai | B25H 3/02 206/503 |
| 2023/0150725 | A1 | 5/2023 | Baron et al. | |
| 2023/0278191 | A1* | 9/2023 | Zhang | B65D 21/0228 206/503 |
| 2024/0059454 | A1* | 2/2024 | Bonilla | B65D 21/0219 |

FOREIGN PATENT DOCUMENTS

| | | | |
|---|---|---|---|
| DE | 202013003741 | U1 | 4/2013 |
| DE | 20201506823 | | 3/2017 |
| DE | 102015013053 | A1 | 4/2017 |
| DE | 102015112204 | B4 | 12/2017 |
| EP | 0555533 | | 8/1993 |
| EP | 1059240 | A1 | 12/2000 |
| EP | 1238602 | A2 | 9/2002 |
| EP | 1018473 | B1 | 1/2003 |
| EP | 1516703 | A1 | 3/2005 |
| EP | 2402259 | A1 | 1/2012 |
| JP | 2005162223 | A | 6/2005 |
| WO | 2011135559 | A1 | 11/2011 |
| WO | 2019105598 | A1 | 6/2019 |

OTHER PUBLICATIONS festoolproducts.com “T-Loc” products, Model #: SYS 1, SYS 2, SYS 3, SYS 4, SYS 5, http://www.festoolproducts.com/Systainer-Storage-System-s/75.htm, Date unknown but prior to U.S. filing date.

dewalt.com, “TSTAK” products, Model #: DWST08201, DWST08203, DWST08204, http://www.dewait com/tool-categories/hand-tools-storage-and-work-support-mobile-work-shop-st orage.aspx, Date unknown but prior to U.S. filing date.

dewalt.com, “Tough System” products, Model#: DWST17804, DWST17803, DWST17807, http://www.dewait com/tool-categories/hand-tools-storage-and-work-support-tstak.aspx, Date unknown but prior to U.S. filing date.

Dewalt ToughSystem 2.0 Toolbox, DWST08165, https://www.dewalt.com/product/dwst08165/toughsystemr-20-toolbox?tid=576956, Screen print of webpage printed Sep. 13, 2022 Original date unknown but prior to U.S. filing date.

Dewalt ToughSystem 2.0 Full-Size Organizer, DWST08040, https://www.dewalt.com/product/dwst08040/toughsystemr-20-full-size-organizer, Screen print of webpage printed Sep. 13, 2022 Original date unknown but prior to U.S. filing date.

* cited by examiner

STACKED TOOLBOX SYSTEM

PRIORITY CLAIM

This application claims priority to Chinese Patent Application No. 202122677703.6 filed on Nov. 3, 2021; Chinese Patent Application No. 202210212862.5 filed on Mar. 4, 2022; Chinese Patent Application No. 202210212005.5 filed on Mar. 4, 2022; and Chinese Patent Application No. 202210588703.5 filed on May 27, 2022. The contents of all of which are hereby incorporated by reference herein.

TECHNICAL FIELD

This application relates to the field of article storage, and in particular to a main storage box, a secondary storage box, and a storage box set.

BACKGROUND INFORMATION

In order to facilitate the user in the case of carrying multiple storage boxes (such as toolboxes) to facilitate the overall movement and use, each storage box is usually stacked together, and each storage box is usually locked together by interlocking, so as to facilitate the user to move and use. A number of ways are known for interlocking storage boxes. Now on the market, there are roughly the following three forms of locking: the first way uses a single plastic latch that can be turned to clasp the lower bottom of the box protrusion to achieve the purpose of interlocking; the second way is the conventional use of the front of the two-segment latch moved to the side to lock between the upper and lower boxes; and the third way uses a combination of steel wire and plastic to lock boxes together at the side. However, the above locking methods can only be interlocked for the same length and width of the shape of the box, and cannot be interlocked for different length and width of the size of the shape of the box, with many professional users needing to carry more and more diverse types of tools, there is an urgent need for interlocking between different sizes of the box.

SUMMARY

Based on this, it is necessary to provide a main storage box that can be interlocked with other storage boxes of different sizes, a secondary storage box for interlocking with the main storage box, and a storage box set having storage boxes of different sizes and interlocked so that existing storage boxes of different sizes cannot be interlocked with each other.

According to an aspect of the present application, there is provided a main storage box comprising: a first box having a first end face; two spaced apart second locking mechanisms, provided symmetrically along the first direction on both edges of said first end face; and at least one first locking mechanism, said at least one first locking mechanism being provided on said first end face and disposed between two spaced apart said second locking mechanisms said at least one first locking mechanism is for being set opposite to any one of said second locking mechanisms to form a first locking gap in a first direction, between two spaced apart said second locking mechanisms being able to form a second locking gap in a first direction.

In one embodiment, each said first locking mechanism comprises a first snap hook, said first snap hook being movably mounted to said first box to enable one said first locking mechanism to form said first locking gap with one said second locking mechanism.

In one embodiment, said first end surface is provided with a first recess, one end of said first snap hook being movably mounted in said first recess to enable the other end of said first snap hook to protrude or be housed in said first recess. One said first locking mechanism is capable of forming said first locking gap with one said second locking mechanism when the other end of said first snap hook protrudes from said first recess. In one embodiment, each said second locking mechanism comprises a second recess opened in said main storage box, a second connecting shaft fixed in said second recess and a second snap hook rotatably connected to said second connecting shaft, said second locking mechanism being lockable by flipping of said second snap hook.

In one of the embodiments, each said second locking mechanism comprises a second recess opened in the main storage box, a rail fixed to the bottom wall of said second recess, and a second snap hook capable of moving within said rail, said second locking mechanism being lockable by retraction of said second snap hook.

In one of the embodiments, said first box has a second end surface relative to said first end surface, said second end surface being provided with two second locking positions for cooperating with said second locking mechanism at the edges of said second end surface, the two said second locking positions being spaced along said first direction.

According to another aspect of the present application, there is provided a secondary storage box for cooperating with said main storage box, said secondary storage box comprising a second box, said second box having a third end face, at least one second locking mechanism provided on said third end face and a third locking mechanism provided opposite to said second locking mechanism, said second locking mechanism and said third locking mechanism forming a third locking gap between said second locking mechanism and said third locking mechanism.

In one embodiment, said secondary storage box further comprises a second locking mechanism, said fourth end face opposite said third end face, said fourth end face provided with a second locking bit opposite said second locking mechanism and a first locking bit opposite said third locking mechanism.

According to a further aspect of the present application, there is provided a storage box set, said storage box set comprising at least one said main storage box and at least one said secondary storage box; one said main storage box being capable of being stacked and locked with at least one said secondary storage box on top of each other.

When one said main storage box is stacked and locked in place with one said secondary storage box, said first locking mechanism of said main storage box snaps into said first locking position of said secondary storage box, and said second locking mechanism of said main storage box snaps into said second locking position of said secondary storage box so that said secondary storage box is confined in said first locking gap.

In one embodiment, said main storage box has a plurality of recessed portions opened on said first end, said main storage box has a plurality of tabs opened on said second end; said secondary storage box has a plurality of said recessed portions opened on said third end, said secondary storage box has a plurality of said tabs opened on said fourth end, each said tab being capable of being confined in one of said recessed portions to prevent stacking of one another said main storage box and said secondary storage box from moving relative to each other.

Said main storage box, sub-storage box and storage box set, by providing two spaced and symmetrically provided second locking mechanisms at the edge of one end face of the main storage box, and at least one first locking mechanism between the two second locking mechanisms, so that one first locking mechanism and one second locking mechanism can form a first locking gap, or so that two spaced and symmetrically provided second locking mechanisms can form A second locking gap, not only can the first locking mechanism and the second locking mechanism cooperate to make the secondary storage box confined in the first locking gap of the main storage box, so that the main storage box and the secondary storage box of different sizes can be interlocked when they are stacked together, but also can make use of the cooperation of multiple second locking mechanisms to make one main storage box confined in the second locking gap of another main storage box, so that the main storage box of the same size can be interlocked with the secondary storage box. This allows interlocking of main storage boxes of the same size when they are stacked together. This greatly expands the convenience and versatility of the main storage box, secondary storage box and storage box group, greatly enhancing the user's experience.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
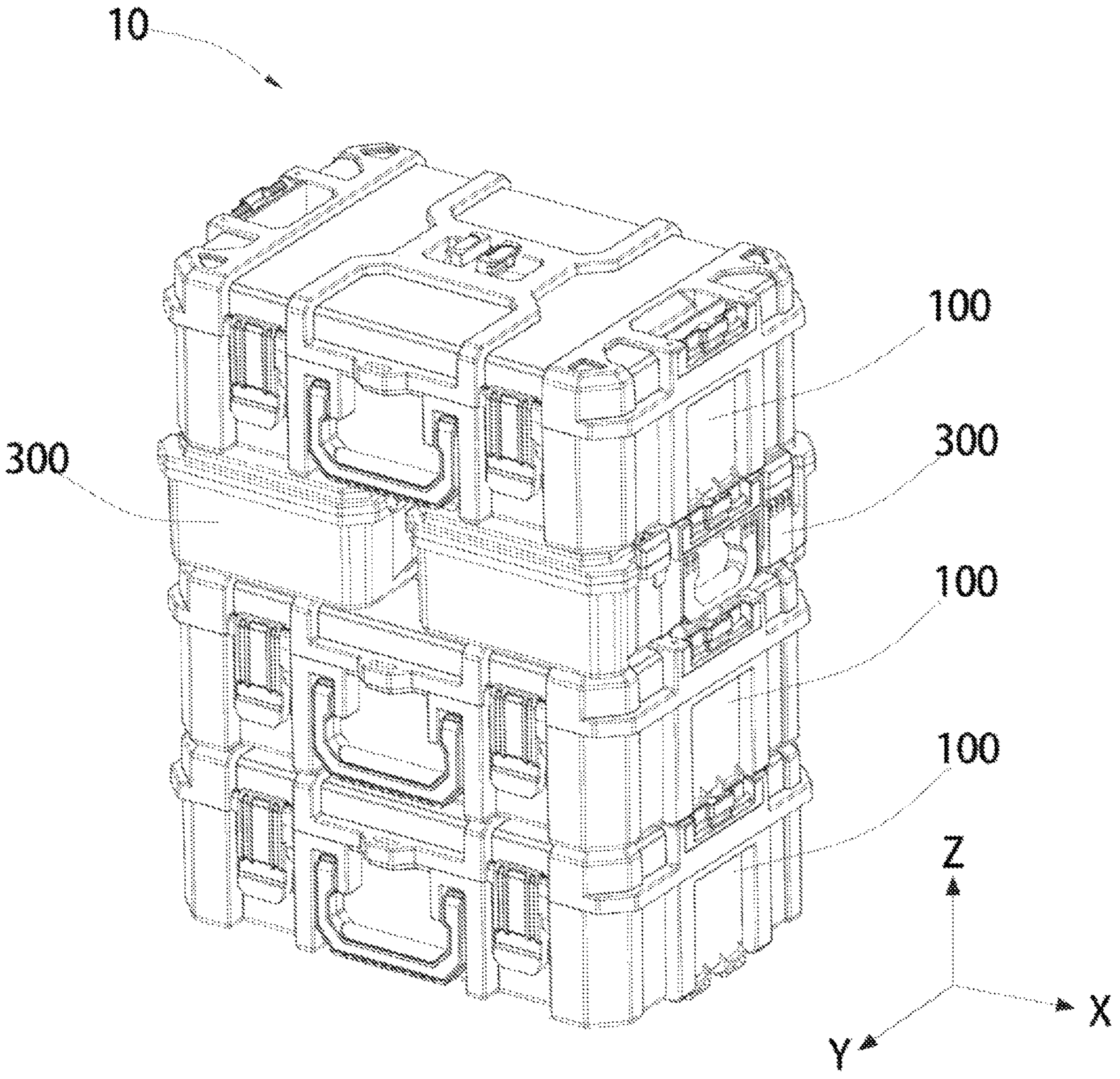
FIG. 1 is a three-dimensional schematic diagram of a storage box set of an embodiment provided by the invention.

Referring to FIGS. 1-16, in order to make the above purpose, features and advantages of the invention more obvious and easy to understand, the following detailed description of the specific implementation of this invention is made in conjunction with the accompanying drawings. In the following description, many specific details are set forth to facilitate a full understanding of the invention. However, the invention can be implemented in many other ways than those described herein, and a person skilled in the art can make similar improvements without violating the connotation of the invention, so the invention is not limited by the specific embodiments disclosed below.

It should be noted that when an element is said to be "fixed" to another element, it may be directly on the other element or there may also be a centered element. When an element is considered to be "attached" to another element, it may be directly attached to the other element or there may be both centered elements.

Unless otherwise defined, all technical and scientific terms used herein have the same meaning as commonly understood by those of skill in the art belonging to the invention. The terms used herein in the specification of the invention are for the purpose of describing specific embodiments only and are not intended to limit the invention. The term "and/or" as used herein includes any and all combinations of one or more of the relevant listed items.

An embodiment of the invention provides a main storage box 100, a secondary storage box 300 making up a storage box set 10. The structure of the storage box set 10 and the main storage box 100 and the secondary storage box 300 in the storage box set 10 in this application is described below as an example of a tool box, which can include at least two main storage boxes 100 of the same size and dimension, or can include main storage boxes 100 and secondary storage boxes 300 of different sizes and dimensions. The storage box set 10 can include at least two main storage boxes 100 of the same size, but also can include different sizes of the main storage box 100 and secondary storage box 300, each storage box stacked together, adjacent to the upper and lower two layers of the storage box can achieve interlock for the convenience of users to carry and use.

The present embodiment is used as an example only and does not limit the technical scope of the present application. It is understood that in other embodiments, the structure of the main storage box 100 and the secondary storage box 300 can also be used for other storage boxes other than toolboxes, and will not be limited here.

Figure 2:
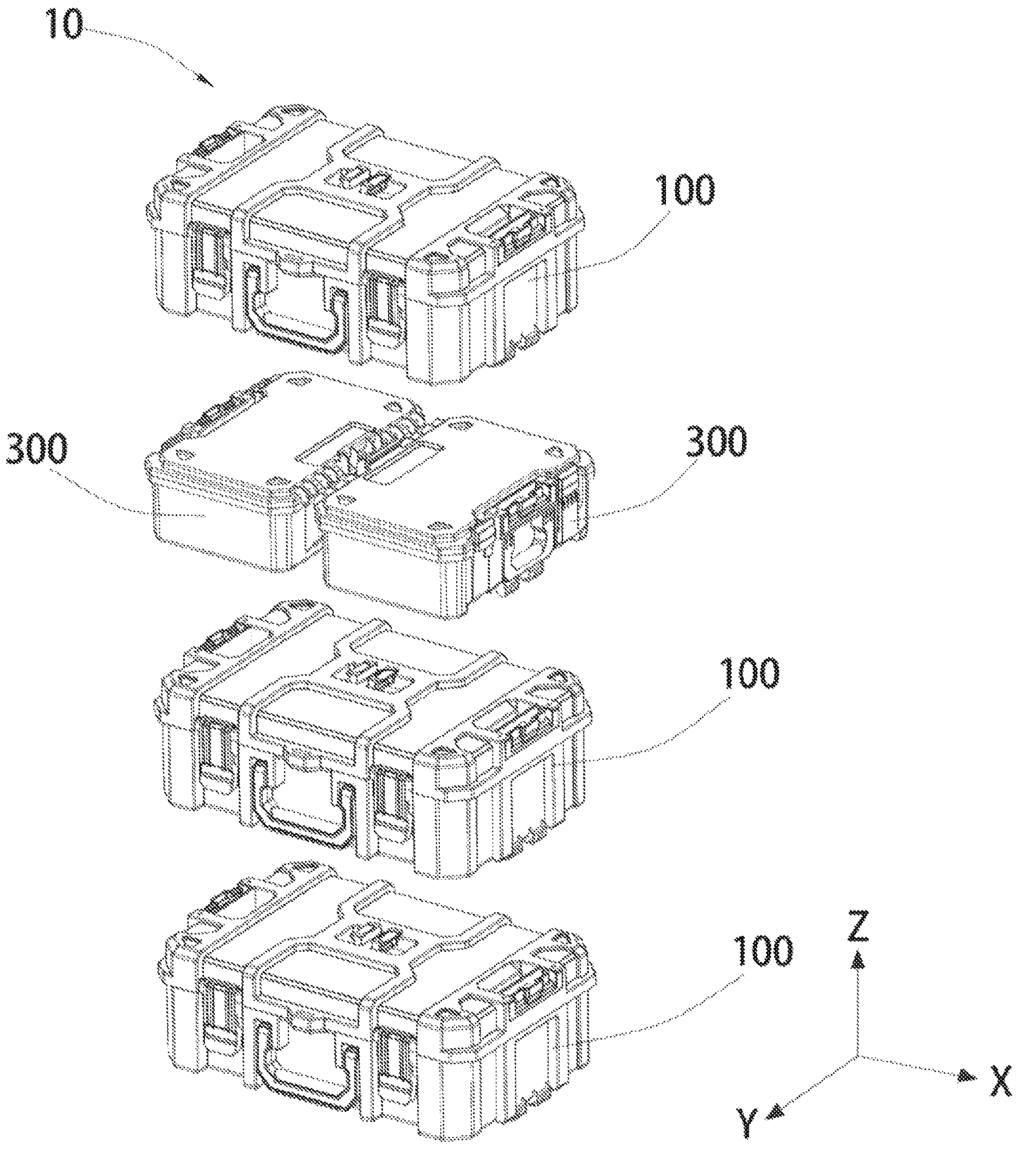
FIG. 2 an exploded schematic diagram of the storage box set of an embodiment provided by the invention.

In one embodiment, the storage box set 10, as shown in FIGS. 1 and 2, includes three main storage boxes 100 and two secondary storage boxes 300 stacked and locked together, with the main storage boxes 100 and secondary storage boxes 300 having different dimensions. Two adjacent main storage boxes 100 are stacked and locked together in the third direction, two secondary storage boxes 300 are placed side by side in the first direction and locked above the two adjacent main storage boxes 100, and another main storage box 100 is stacked and locked above the two secondary storage boxes 300 placed side by side in the first direction. The two adjacent main storage boxes 100 are aligned and stacked with each other, and the long side of each secondary storage box 300 is aligned with the short side of one main storage box 100, so that the storage box set 10 provided by the invention can have storage boxes of different sizes aligned and stacked with each other and locked together. The arrangement of the storage boxes 100 and secondary storage boxes 300 can take any form with one or the other on top of the other.

Figure 3:
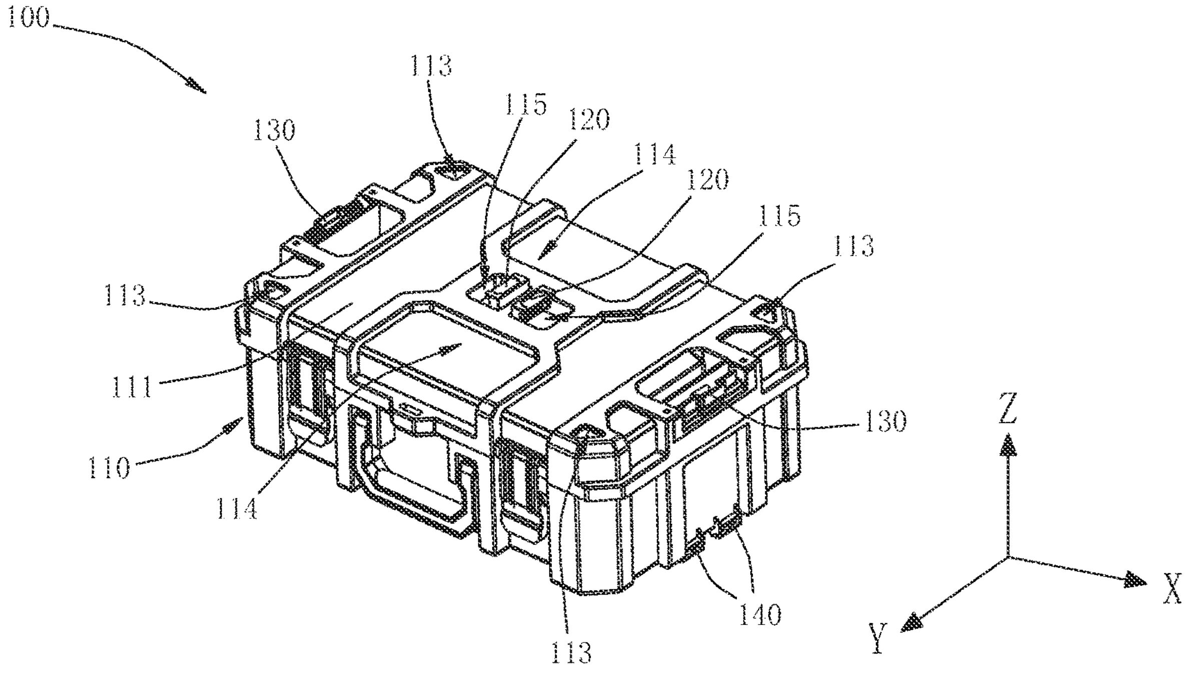
FIG. 3 a three-dimensional schematic diagram of an angle of the first storage box provided by the invention.
Figure 4:
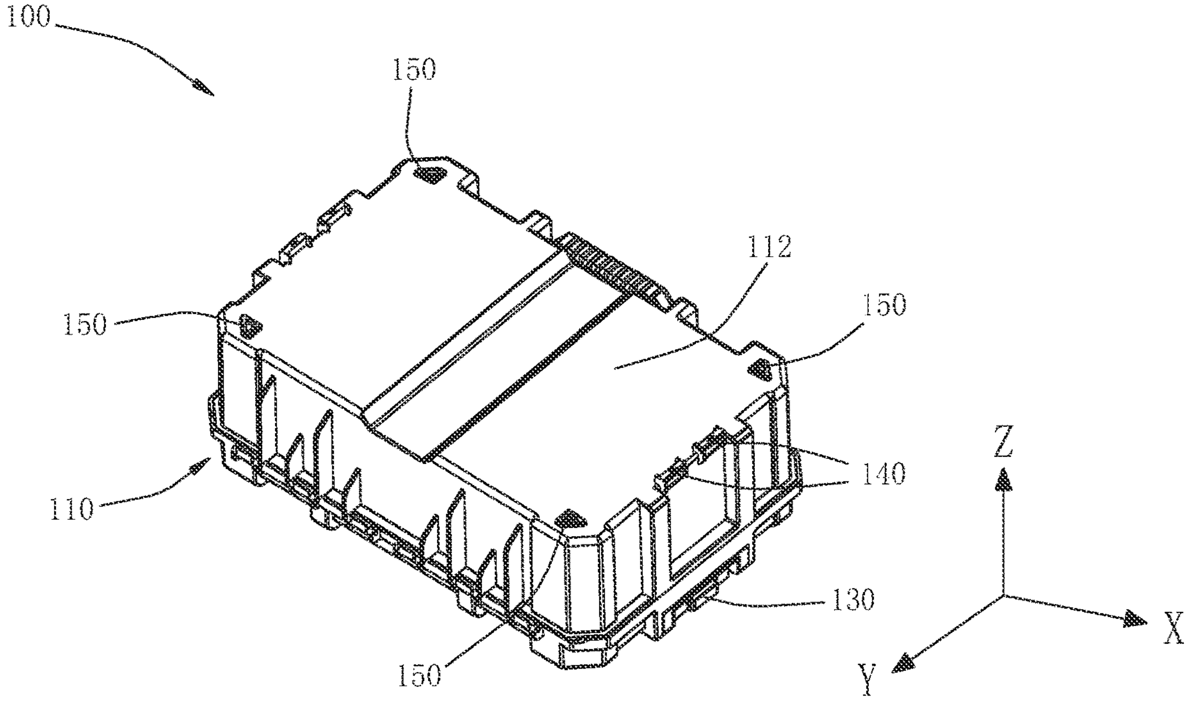
FIG. 4 a three-dimensional schematic diagram of another angle of the first storage box provided by the invention.

In some embodiments, as shown in FIGS. 3 and 4, the main storage box 100 has a rectangular cube structure and includes a first box body 110. The first box body 110 of the main storage box 100 has a first end face 111 and a second end face 112 that are relatively parallel along the third direction. The first end 111 forms a part of the lid into the interior of the first box body 111. A first locking mechanism 120 and a second locking mechanism 130 can be provided on the first end face 111. Two first locking mechanisms 120 can be provided at the middle of the first end face 111, and two second locking mechanisms 130 can be provided at the edges of the two short sides of the first end face 111, each of which is symmetrical and spaced along the first direction with the central axis of the first box 110 as the axis of symmetry.

In this way, one first locking mechanism 120 and one second locking mechanism 130 spaced relatively therebetween can form a first locking gap in the first direction, and the first locking gap can be used to lock the secondary storage box 300, and one second locking mechanism 130 can form a second locking gap with another second locking mechanism 130 in the first direction, and the second locking gap can be used to lock the main storage box 100.

Figure 5:
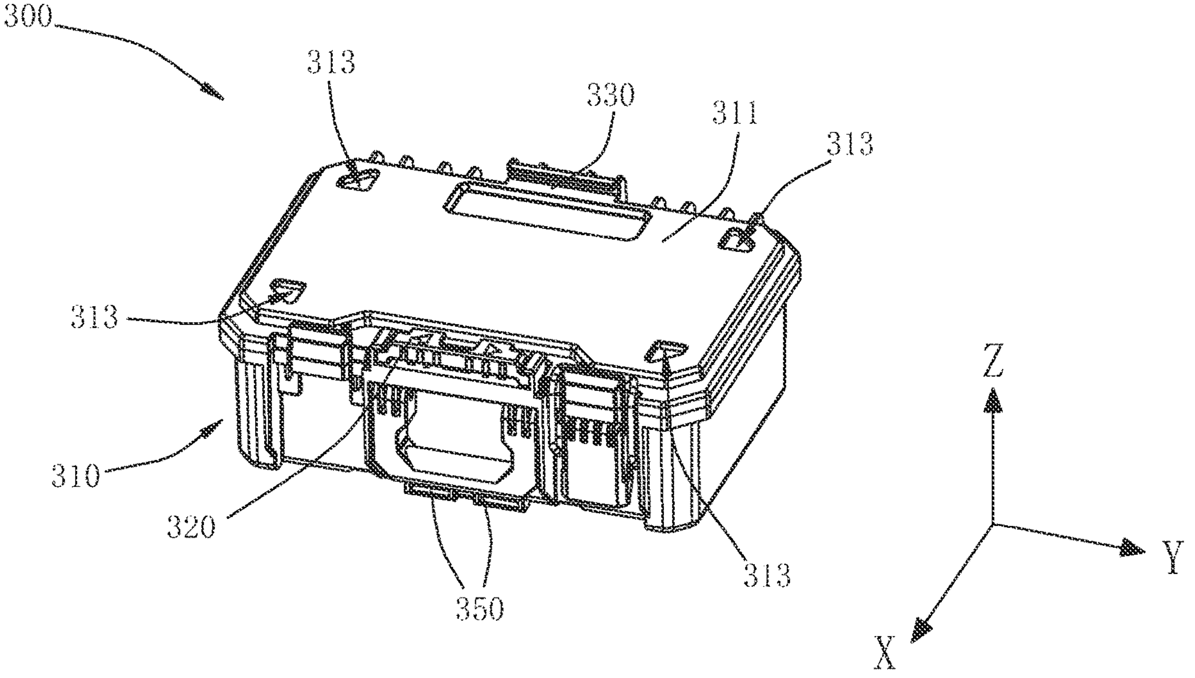
FIG. 5 a three-dimensional schematic diagram of an angle of the second storage box provided by the invention.

In some embodiments, two spaced-apart second locking bits 140 are provided correspondingly on two opposing short edge edges of the second end face 112 of the main storage box 100, each second locking bit 140 being provided opposite a second locking mechanism 130 in a third direction. In a preferred embodiment, the second locking bits 140 are provided at the second end face 112 of the main storage box 100. In a preferred embodiment, as shown in FIGS. 3 and 5, the second locking bits 140 are mounts having a holding cavity with an opening at one end of the holding cavity away from the first box body 110.

With the storage box set 10 placed in the orientation shown in FIG. 1, the long side of the main storage box 100 is oriented in the same direction as the first direction and the short side of the main storage box 100 is oriented in the same direction as the second direction. The X direction in the figure is the first direction, the Y direction is the second direction, the Z direction is the third direction, and the first direction, the second direction and the third direction are perpendicular to each other.

When one main storage box 100 and another main storage box 100 are stacked on top of each other, the first end face 111 of the main storage box 100 located below fits into the second end face 112 of the main storage box 100 located above, and each second locking mechanism 130 snaps into a second locking bit 140, so that one of the main storage boxes 100 is confined to the other main storage box 100 in the second locking position to achieve interlocking between the two main storage boxes 100.

In some embodiments, the main storage box 100 is further provided with a plurality of tabs at the second end face 112, the tabs of the main storage box 100 including four first tabs 150 provided at the four corner positions of the second end face 112, a plurality of depressions at the first end face 111 of the main storage box 100, the depressions including a first depression 113 and a second depression 114, the first depression 113 having four, set at the four top corners of the first end face 111 at positions corresponding to the four first tabs 150. The two second depressions 114 are provided symmetrically along the short side of the second end face 112 in the middle of the second end face 112 near the long side. When the two main storage boxes 100 are stacked up and down in the third direction, each of the first tabs 150 is confined in one of the first depressions 113 to further limit the relative movement of the two adjacent main storage boxes 100 in the first direction or the second direction when stacked on top of each other.

Figure 6:
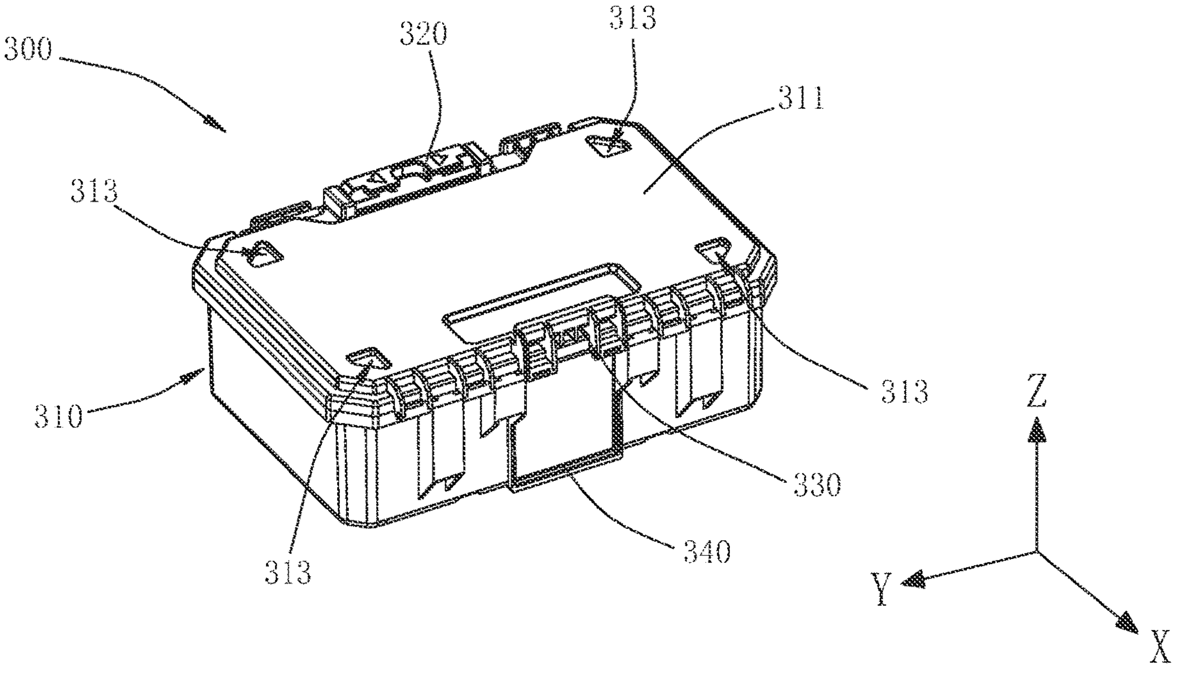
FIG. 6 a three-dimensional schematic diagram of another angle of the second storage box provided by the invention.
Figure 7:
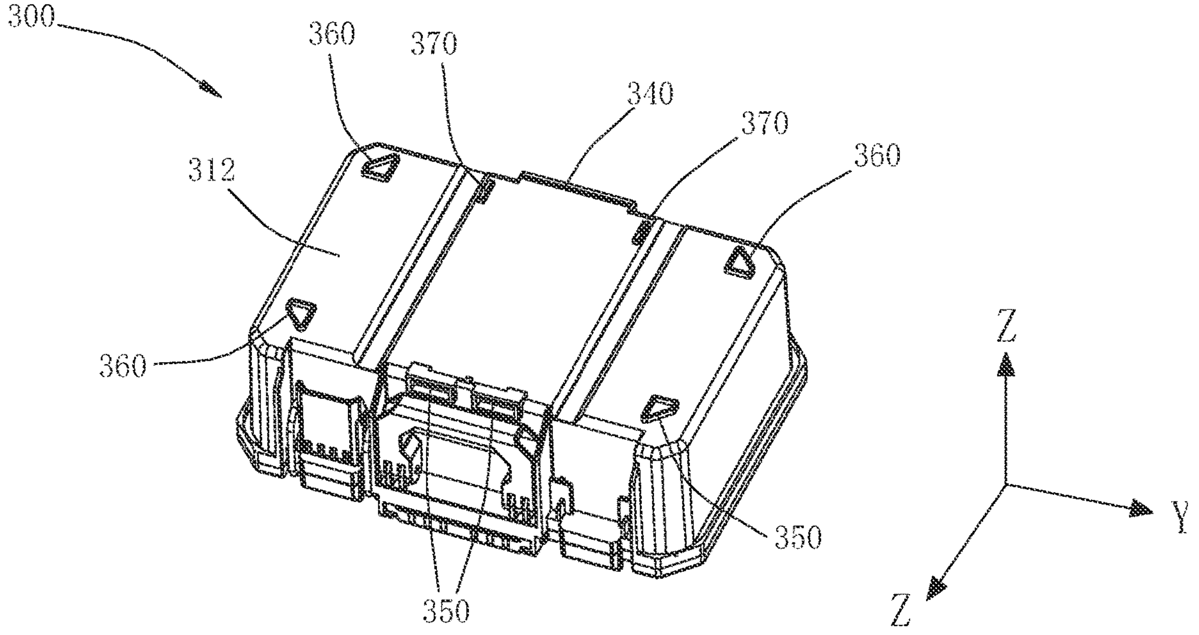
FIG. 7 a three-dimensional schematic diagram of another angle of the second storage box provided by the invention.

In some embodiments, as shown in FIGS. 5, 6 and 7, the secondary storage box 300 includes a second box 310 having a third end face 311 and a fourth end face 312 relatively parallel to the third end face 311, and the dimensions of the length and width of the secondary storage box 300 are smaller than those of the main storage box 100. The second locking mechanism 320 and the third locking mechanism 330 are provided on the edge of one long side of the third end face 311, and a third locking gap is formed between the second locking mechanism 320 and the third locking mechanism 330, and the third locking gap can be used to lock the other secondary storage box 300. A first locking bit 340 and a second locking bit 350 are provided on each of the two long edges of the fourth end face 312, with one first locking bit 340 and one second locking bit 350 provided opposite each other. The first locking bit 340 may be locked with the third locking mechanism 330 to achieve stacking interlocking between the two secondary storage boxes 300. The first locking bit 340 may also be locked with the first locking mechanism 120 of the main storage box 100 to achieve stacking interlocking between the secondary storage box 300 and the main storage box 100. The second locking bit 350 may be locked with the second locking mechanism 320 of the secondary storage box 300, thereby also enabling stacking interlocking between two secondary storage boxes 300; the second locking bit 350 may also be locked with the second locking mechanism 130 of the main storage box 100, thereby also enabling stacking interlocking between the secondary storage box 300 and the main storage box 100. With the storage box set 10 placed in the orientation shown in FIG. 1, the long side of the secondary storage box 300 is oriented in the same direction as the second orientation.

Figure 9:
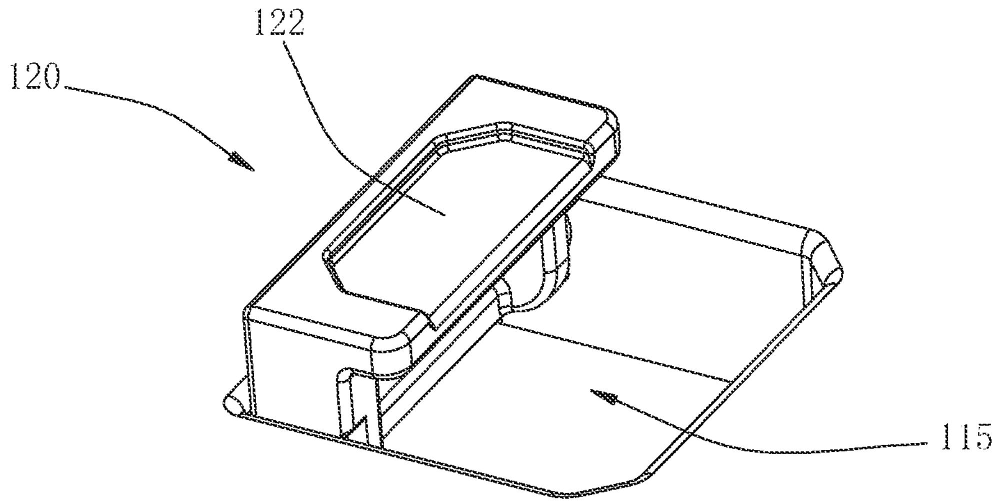
FIG. 9 a three-dimensional schematic diagram of the first locking mechanism provided by the invention.
Figure 15:
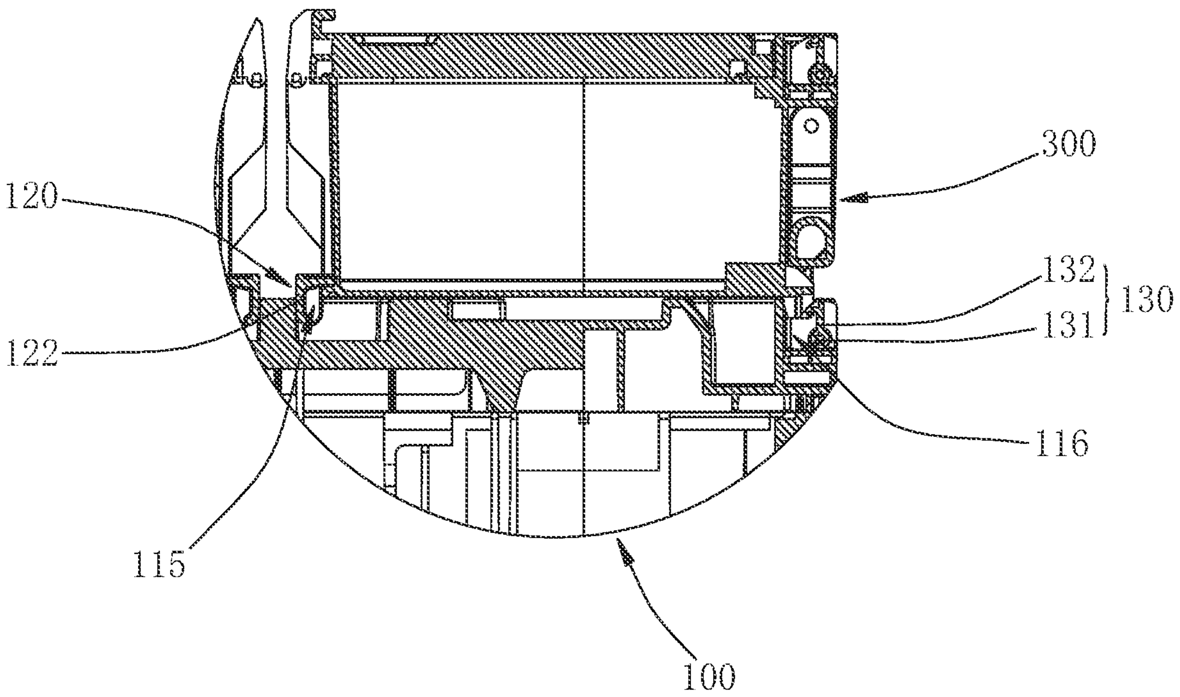
FIG. 15 is a cross-sectional view along the third direction when the first storage box and the second storage box are interlocked when the second locking mechanism is the first embodiment.

In some embodiments, as shown in FIG. 6, FIG. 9 and FIG. 15, the first locking bit 340 of the secondary storage box 300 is opened at one long edge of the fourth end face 312 of the secondary storage box 300, with the first locking bit 340 preferably being a rib position located at one long edge of the fourth end face 312 of the secondary storage box 300. In a preferred embodiment, as shown in FIG. 5, the second locking bit 350 of the secondary storage box 300 is also a mount having a holding cavity with an opening at one end of the holding cavity away from the second box 310.

When a secondary storage box 300 is stacked above a main storage box 100, a first end face 111 of the main storage box 100 at the bottom fits over a fourth end face 312 of the secondary storage box 300 at the top, and a first locking mechanism 120 of the main storage box 100 snaps into a first locking bit 340 of the secondary storage box 300, and a second locking mechanism 130 of the main storage box 100 snaps into a first locking bit 340 of the secondary storage box 300, as shown in conjunction with FIGS. 1 and 2. A second locking mechanism 130 of the main storage box 100 snaps into a second locking bit 350 of a secondary storage box 300 so that a secondary storage box 300 is confined to a first locking bit 340 of the main storage box 100 to achieve interlocking between a main storage box 100 and a secondary storage box 300.

When two secondary storage boxes 300 are stacked on top of one main storage box 100, two first locking mechanisms 120 of the main storage box 100 snap into the respective first locking bits 340 of the two secondary storage boxes 300, and two second locking mechanisms 130 of the main storage box 100 snap into the respective second locking bits 350 of the two secondary storage boxes 300, so that the two secondary storage boxes 300 are respectively confined in the two first locking gaps of one main storage box 100 to achieve interlocking of the two secondary storage boxes 300 located above and one main storage box 100 located below.

When one main storage box 100 is stacked above two secondary storage boxes 300, the second end face 112 of the main storage box 100 located above fits into the third end face 311 of the secondary storage box 300 located below, and the respective second locking mechanism 320 of the two secondary storage boxes 300 can form a fourth locking gap along the first direction, and the second locking mechanism 320 of the two secondary storage boxes 300 snap into the two second locking bits 140 of the main storage box 100 above, respectively, so that one main storage box 100 located above the two secondary storage boxes 300 is confined in the fourth locking gap to achieve interlocking of one main storage box located above with the two secondary storage boxes 300 located below.

Figure 8:
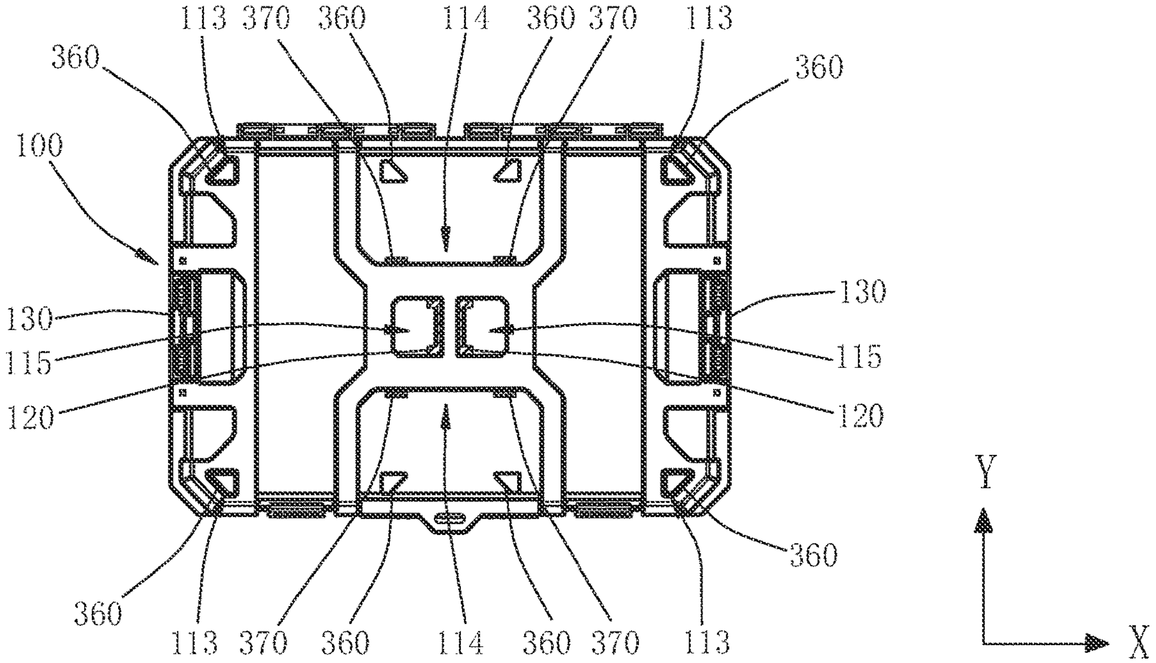
FIG. 8 a cross-sectional view along the second direction of the first storage box and the second storage box provided by the invention when stacked.

In some embodiments, as shown in FIGS. 7 and 8, the secondary storage box 300 is also provided with a plurality of tabs at the fourth end face 312, and the tabs of the secondary storage box 300 include four third tabs 360 and two fourth tabs 370, the four third tabs 360 being provided at the positions of the four corners of the fourth end face 312, and the two fourth tabs 370 being provided symmetrically along the short side direction of the fourth end face 312 at the A plurality of depressions are provided in the third end face 311 of the sub-storage box 300, and the depressions include a third depression 313, and the third depression 313 has four, which are provided at the positions of the four corners of the third end face 311, corresponding to the four third tabs 360.

When a secondary storage box 300 is stacked on top of a main storage box 100, the two third tabs 360 of the secondary storage box 300 are confined in the two first depressions 113 of the main storage box 100 to limit relative movement of the main storage box 100 and the secondary storage box 300 in the second direction or the third direction when stacked on top of each other. The two fourth tabs 370 of the secondary storage box 300 are confined in the two second depressions 114 of the main storage box 100, wherein one side of each of the fourth tabs 370 fits against a side wall of one of the second depressions 114 to further limit relative movement of the main storage box 100 and the secondary storage box 300 in the third direction when stacked on top of each other.

When a main storage box 100 is stacked above two secondary storage boxes 300, two of the four first tabs 150 of the main storage box 100 located above are limited to two third depressions 313 of one of the secondary storage boxes 300 located below, and the other two first tabs 150 are limited to two third depressions 313 of the other secondary storage box 300 located below to achieve the purpose of limiting the relative movement of the main storage box 100 and the secondary storage box 300 in the second or third direction when stacked with each other. The number and shape of the tabs and corresponding depressions of the main storage box 100 or the secondary storage box 300 are not limited, but can be round, square, polygonal, or elongated, as long as they can limit the relative displacement along the second direction and the third direction between the two stacked storage boxes.

It should be noted that the first locking mechanism 120 and the second locking mechanism 130 of the main storage box 100, and the third locking mechanism 330 of the second locking mechanism 320 of the secondary storage box 300 can be unlimited in number, and some more numbers of the first locking mechanism 120 and the second locking mechanism 130 can be provided at the first end face 111 of the main storage box 100, and thus more numbers of secondary storage boxes 300 can be realized and a main storage box 100 stacking and locking fit.

The stacking of the storage boxes is not limited to the stacking and locking of the secondary storage boxes 300 at the top of the main storage box 100, but also to the stacking and locking of multiple secondary storage boxes 300 in the middle of the two main storage boxes 100.

In some embodiments, shown in conjunction with FIGS. 2, 3, and 5, the first locking mechanism 120 and the second locking mechanism 130 of the main storage box 100 are both retractable structures, and the first locking mechanism 120 of the main storage box 100 or the second locking mechanism 130 of the main storage box 100 are capable of moving relative to the first box body 110 to form a first locking gap on the first end face 111 of the first box body 110 in the first or a second locking gap in the first direction on the first end face 111 of the first box body 110 so that the secondary storage box 300 can be confined in the first locking gap of the main storage box 100 to achieve interlocking of the main storage box 100 and the secondary storage box 300, or so that one main storage box 100 is confined in the second locking gap of the other main storage box 100 The interlocking between the two main storage boxes 100 is achieved.

Figure 10:
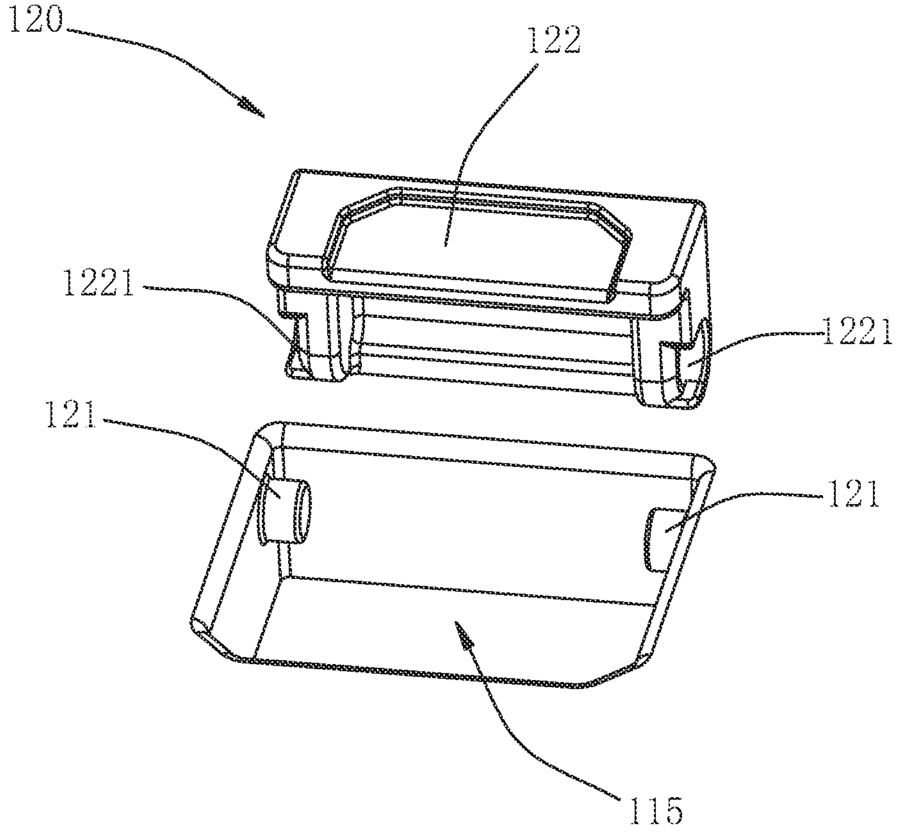
FIG. 10 an exploded schematic diagram of the first locking mechanism provided by the invention.

Specifically, in a preferred embodiment, as shown in FIGS. 9 and 10, the first locking mechanism 120 includes a first connecting shaft 121 and a first snap hook 122 provided on the first box body 110, and a first recess 115 is provided at the location where the first locking mechanism 120 is installed on the first end face 111 of the main storage box 100. The first connection shaft 121 is preferably two, and one end of the two first connection shafts 121 is fixed to two opposite side walls of the first recess 115 in the second direction, and the two first connection shafts 121 are coaxially provided, and the end of the first snap hook 122 near the first recess 115 is provided with two mounting brackets for mounting the first connection shaft 121. The first snap hook 122 is provided with two mounting holes 1221 near the first recess 115 for mounting the first connection shaft 121, and each mounting hole 1221 is provided with one first connection shaft 121, so that the first snap hook 122 can rotate around the central axis of the two first connection shafts 121 to realize the turning of the first locking mechanism 120.

When the first locking mechanism 120 of the main storage box 100 snaps into the first locking bit 340 of the secondary storage box 300, the first snap hook 122 rotates relative to the first connection shaft 121 so that the end of the first snap hook away from the first connection shaft 121 protrudes from the first recess 115, while the bent portion of the first snap hook 122 hooks and holds against the outer wall of the ribbed position and cooperates with the second locking mechanism 130 to form the first locking gap thereby limiting the displacement of the main storage box 100 and the secondary storage box 300 in the first direction and the second direction. When it is not necessary to interlock the main storage box 100 and the secondary storage box 300, the first snap hook 122 is rotated in the opposite direction with respect to the first connection shaft 121 so that the first snap hook 122 is completely accommodated in the first recess 115, thereby keeping the first end face 111 of the main storage box 100 flat.

It is to be noted that the movable way of the first locking mechanism 120 relative to the second box 310 is not limited to a rotatable movable way, but may also be a retractable movable way. One end of the first snap hook 122 is movably mounted and housed in the first recess 115, and when the locking between the storage boxes is required, the end of the first snap hook 122 mounted in the first recess 115 moves in the first direction toward the secondary storage box 300 so that the other end extends out of the first recess 115 and snaps into the first locking bit 340, thereby forming a fit between the first snap hook 122 and the second locking mechanism 130 to form a first locking gap in the first direction on the first end face 111 of the main storage box 100. When it is not necessary to interlock the main storage box 100 with the secondary storage box 300, the first snap hook 122 is moved in the first direction toward the first box body 110 of the main storage box 100 so that the first snap hook 122 is fully accommodated in the first recess 115.

Figure 11:
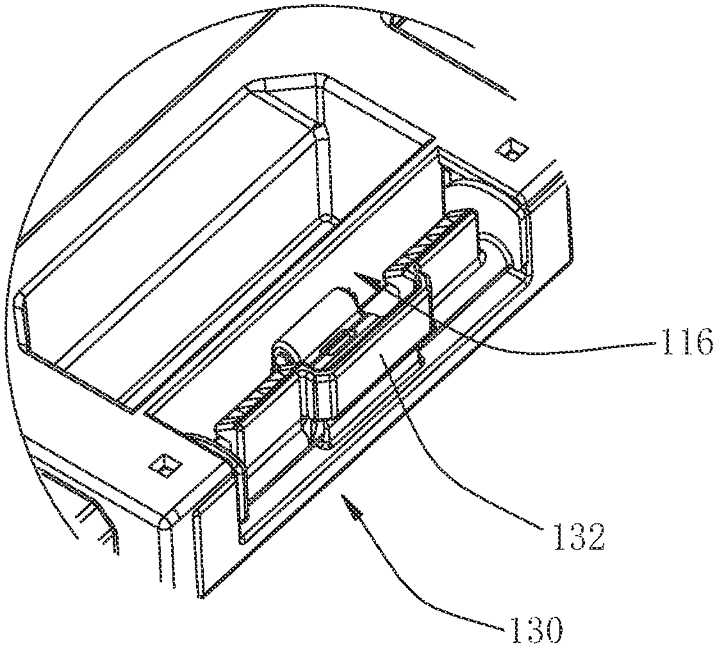
FIG. 11 a three-dimensional schematic diagram of the second locking mechanism of the first embodiment provided by the invention.
Figure 12:
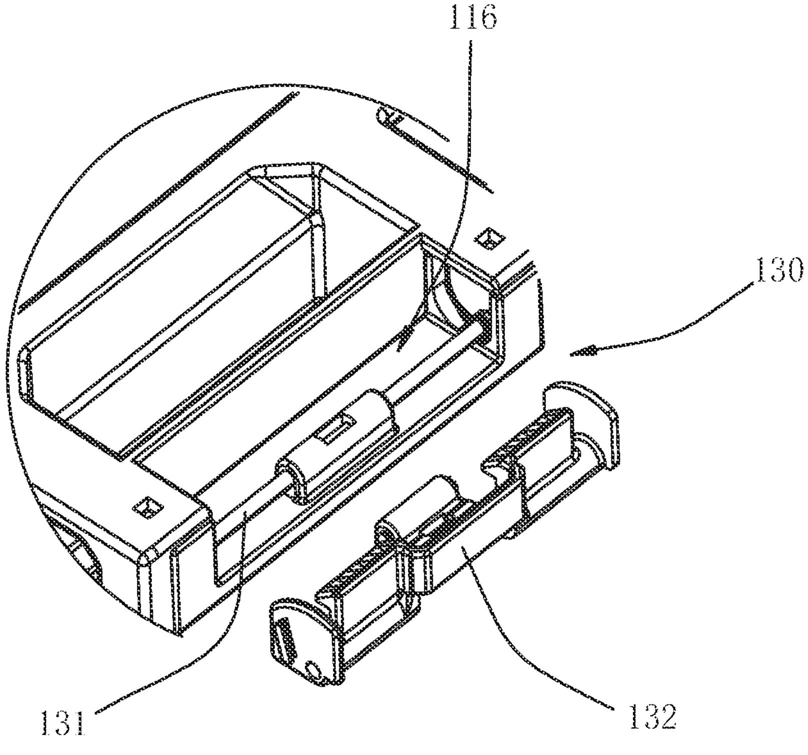
FIG. 12 an exploded schematic diagram of the second locking mechanism of the first embodiment provided by the invention.

As shown in FIG. 11, FIG. 12 and FIG. 15, the structure of the second locking mechanism 130 is described with the second locking mechanism 130 installed in the main storage box 100 as an example. A first embodiment of the second locking mechanism 130 is shown in the figure, and the second locking mechanism 130 includes a second attachment shaft 131 and a second snap hook 132, and a second recess 116 is provided at the location where the second locking mechanism 130 is installed on the first end face 111 of the main storage box 100, and the second recess 116 is provided at the edge of the first end face 111, and the second recess 116 is open along the first direction and the second The second recess 116 is opened at the edge of the first end face 111 and the second recess 116 is open at one end in the first and second directions. The two ends of the second attachment shaft 131 are fixed to two opposite side walls of the second recess 116 along the third direction perpendicular to each other, and the second snap hook 132 is provided on the second attachment shaft 131 so that the second snap hook 132 can rotate around the central axis of the second attachment shaft 131.

Figure 16:
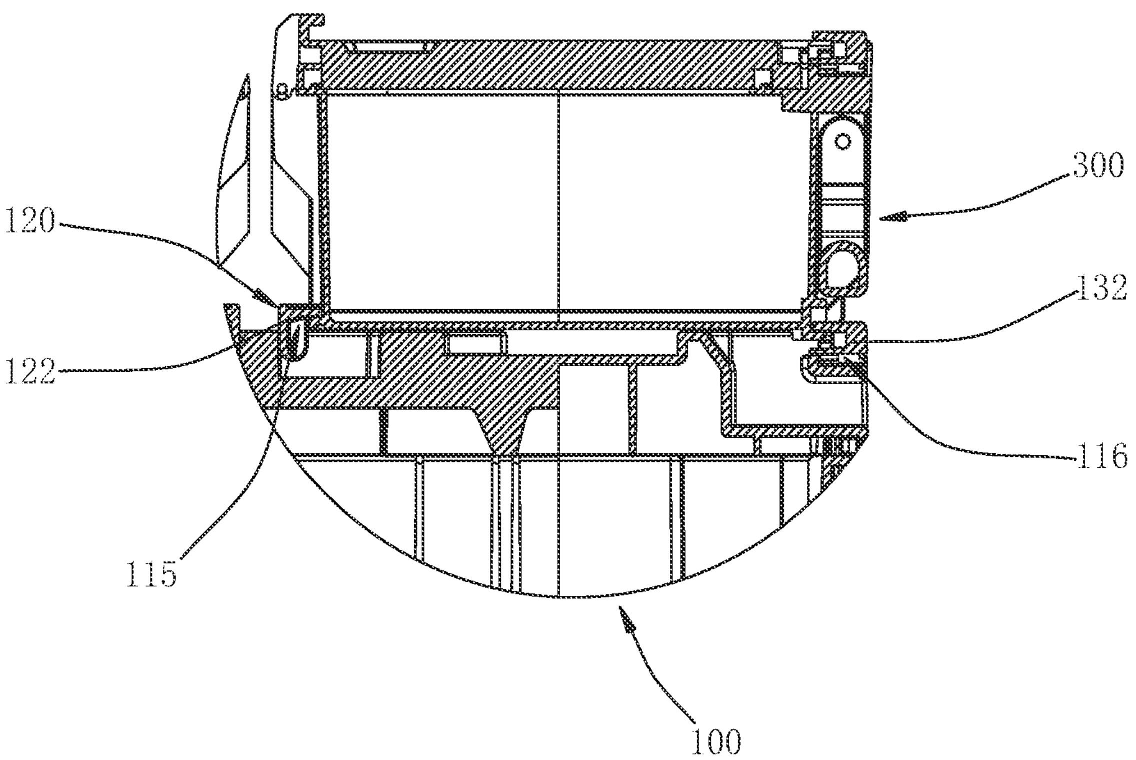
FIG. 16 shows a cross-sectional view along the third direction when the second locking mechanism is the first storage box and the second storage box interlocked for the second embodiment.

As shown in conjunction with FIG. 1, FIG. 15 and FIG. 16, when the second locking mechanism 130 of the main storage box 100 snaps into the second locking bit 140 of the secondary storage box 300, or when the second locking mechanism 130 of one main storage box 100 snaps into the second locking position 140 of the other main storage box 100, the second snap hook 132 is rotated relative to the second attachment shaft 131 to be fully accommodated in the second recess 116 so that the second locking mechanism 130 can cooperate with the first locking mechanism 120 so as to form a first locking gap in the first direction on the first end face 111 of the main storage box 100, or so that the two second locking mechanisms 130 of the main storage box 100 can cooperate so as to form a second locking gap in the first direction on the first end face 111 of the main storage box 100, when the side of the first box body 110 remains flat while the bent portion of the second snap hook 132 hooks the bottom cavity wall of the holding cavity of the mount in the second locking bit 140 and holds against the side cavity wall of the holding cavity of the mount to limit the mutual displacement between the main storage box 100 and the secondary storage box 300 or between the two main storage boxes 100 in the second direction and the third direction.

When it is not necessary to interlock the main storage box 100 and the secondary storage box 300 or when it is not necessary to lock the two main storage boxes 100 to each other, the second snap hook 132 is rotated in the opposite direction relative to the second attachment shaft 131 so that the end of the second snap hook 132 away from the second attachment shaft 131 extends out of the second recess 116.

Figure 13:
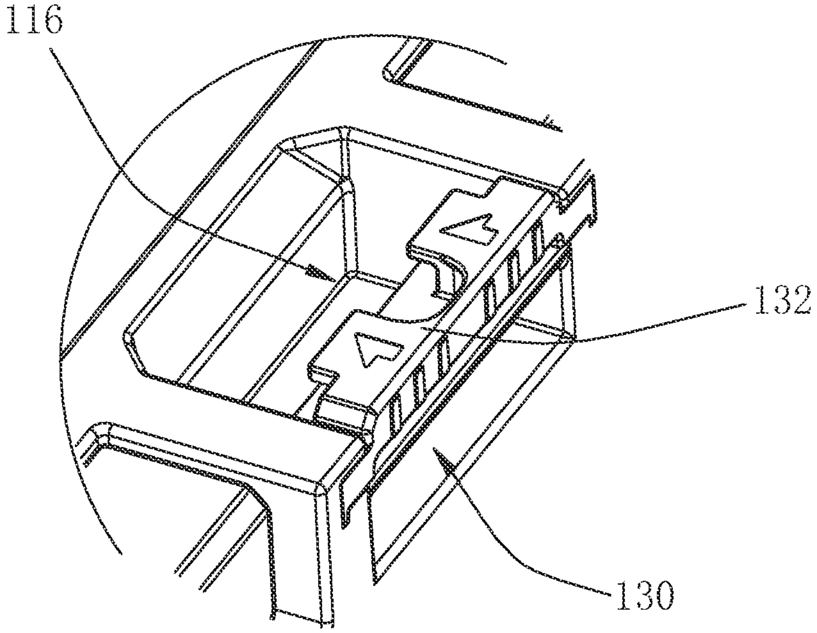
FIG. 13 a three-dimensional schematic diagram of the second locking mechanism of the second embodiment provided by the invention.
Figure 14:
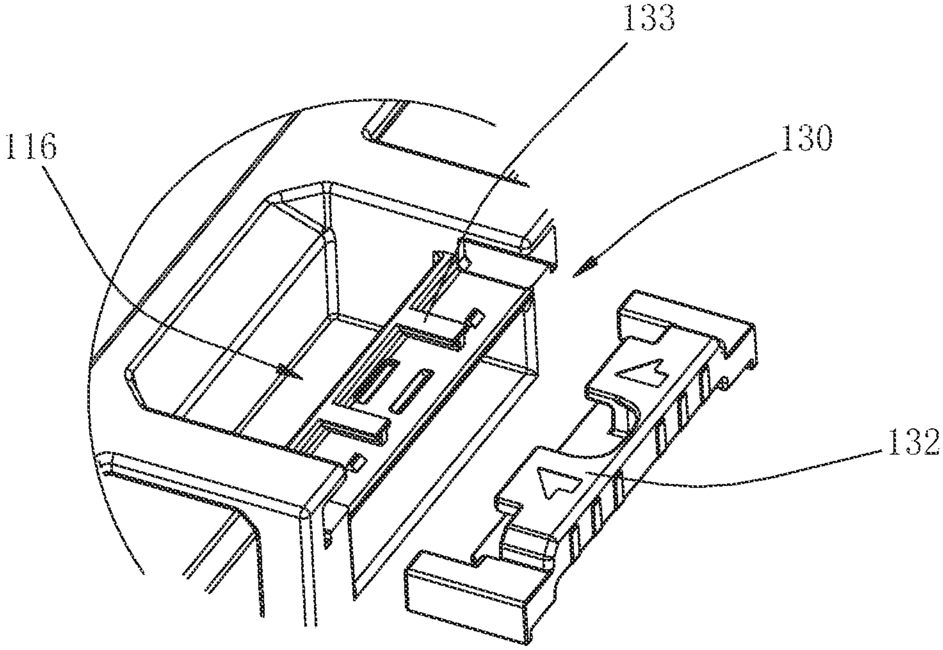
FIG. 14 is an exploded schematic diagram of the second locking mechanism of the second embodiment provided by the invention.

As shown in FIG. 13, FIG. 14 and FIG. 16, again taking the second locking mechanism 130 installed in the main storage box 100 as an example, a second embodiment of the second locking mechanism 130 is shown, and unlike the first embodiment of the second locking mechanism 130, the second locking mechanism 130 is movable in a retractable movable manner relative to the first box body 110. Specifically, the second locking mechanism 130 includes two rails 133, the rails 133 are fixed to the bottom wall of the second recess 116 in the second direction, and the bottom of the second snap hook 132 is provided with two travel slots (not shown) matching the rails 133, each travel slot is set on one rail 133 to enable the second snap hook 132 to move in the second direction. When the second locking mechanism 130 of the main storage box 100 snaps into the second locking bit 140 of the secondary storage box 300, or when the second locking mechanism 130 of one main storage box 100 locks the second locking bit 140 of the other main storage box 100, the second snap hook 132 moves along the rail 133 to fully accommodate the second recess 116, so that the first box body 110 of the main storage box 100 is sides of the first box body 110 of the main storage box 100 are kept flat while the bent portion of the second snap hook 132 is held against the side and bottom cavity walls of the holding cavity of the mount to limit mutual displacement between the main storage box 100 and the secondary storage box 300 or between the two main storage boxes 100 in the second and third directions. When it is not necessary to interlock the main storage box 100 and the secondary storage box 300 or when it is not necessary to lock the two main storage boxes 100 to each other, the second snap hook 132 is moved in the opposite direction along the rail 133 so that one end of the second snap hook 132 extends out of the second recess 116.

The second locking mechanism 320 of the secondary storage box 300 is identical in structure to the second locking mechanism 130 of the main storage box 100. In this embodiment, the second locking mechanism 320 of the secondary storage box 300 is structured in a retractable implementation, with locking achieved by retraction of the snap hooks. The structure of the third locking mechanism 330 of the secondary storage box 300 is similar to the rotatable implementation of the second locking mechanism 320 in the main storage box 100, which is also locked by means of a snap hook flip, and will not be repeated here.

The above storage box set 10, by using the first locking mechanism 120, the second locking mechanism 130, the second locking bit 140, the plurality of tabs and the plurality of corresponding depressions of the main storage box 100 and the second locking mechanism 320, the third locking mechanism 330, the first locking bit 340, the second locking bit 350, the plurality of tabs and the plurality of corresponding depressions of the secondary storage box 300 in conjunction, is able to simultaneously restrict the relative displacement between two stacked boxes in the first direction, the second direction and the third direction, so as to achieve the purpose of interlocking.

When the user needs to use a single storage box, the interlocked storage boxes in the storage box set 10 need to be unlocked. When unlocking two main boxes 100 of the same size, it is necessary to first unlock the second locking mechanism 130 of one main storage box 100, pull out the second snap hook 132 relative to the first box body 110 of the main storage box 100 to protrude from the side of the first box body 110, so that the second snap hook 132 is free from the second locking bit 140, and then unlock the other second locking mechanism 130 so that the second snap hook 132 of the other second The second snap hook 132 of the other second locking mechanism 130 is released from its corresponding second locking bit 140, thereby unlocking the two main storage boxes 100 of the same size. When unlocking two main storage boxes 100 and secondary storage boxes 300 of different sizes, taking the secondary storage boxes 300 stacked on top of the main storage boxes 100 as an example, the second locking mechanism 130 of one first storage box 100 is unlocked first, and then the first locking mechanism 120 is unlocked so that the first snap hook 122 of the first locking mechanism 120 is detached from the first locking bit 340 of the corresponding secondary storage box 300, thus realizing the unlocking of two main storage boxes 100 of the same size. The first locking mechanism 120 is then unlocked so that the first snap hook 122 of the first locking mechanism 120 is disengaged from the first locking bit 340 of the corresponding secondary storage box 300, thus realizing the unlocking of two different sizes of the main storage box 100 and the secondary storage box 300. When unlocking two secondary storage boxes 300 of the same size, the second locking mechanism 320 of one secondary storage box 300 is first unlocked, so that the second locking mechanism 320 is released from its corresponding second locking bit 350, and then the third locking mechanism 330 of one secondary storage box 300 is unlocked, so that the third locking mechanism 330 is released from its corresponding first locking bit 340, thus realizing the unlocking of two secondary storage boxes 300 of the same size. The third locking mechanism 330 is released from its corresponding first locking bit 340, so as to unlock two sub-storage boxes 300 of the same size.

Second Embodiment of Second Locking Mechanism

As shown in FIGS. 17-23, different from the above embodiment 1: the storage box 20*a* in this embodiment (which can be the main storage box and the secondary storage box in the above embodiment 1) also includes a stop part 3*a*; the second locking mechanism 1*a* and the second locking position 2*a* can be automatically locked with each other, and the stop part 3 can make the second locking mechanism 1*a* and the second locking position 2*a* not automatically locked after unlocking, so that the second locking The second locking mechanism 1*a* and the second locking position 2*a* are kept in the unlocked state, so that the second locking mechanism 1*a* and the second locking position 2*a* can be unlocked and separated from each other, freeing the user's hands and facilitating the user's use.

Specifically, the second locking mechanism 1*a* in this embodiment is provided on the lid (i.e., the first end 201*a*) of the storage box 20*a*, which includes a mounting part 11*a*, a locking part 12*a* movable relative to the mounting part 11*a* and a first elastic member 13*a* located between the mounting part 11*a* and the locking part 12*a*, and the locking part 12*a* can be automatically kept in the locked state by the action of the first elastic member 13*a*. In addition, in order to facilitate the positioning of the second locking mechanism 1 a when interlocking with the second locking bit 2*a*, a positioning slot 41*a* may be provided in the box lid, and the positioning slot 41*a* may accommodate exactly the bottom of the box (i.e., the second end face 202*a*), and the second locking mechanism 1*a* may be provided at the edge of the positioning slot 41*a*. In other embodiments, the positioning slot 41*a* can be positioned with the projections provided on the bottom of the box for the upper and lower storage boxes 20*a* when stacked.

Figure 23:
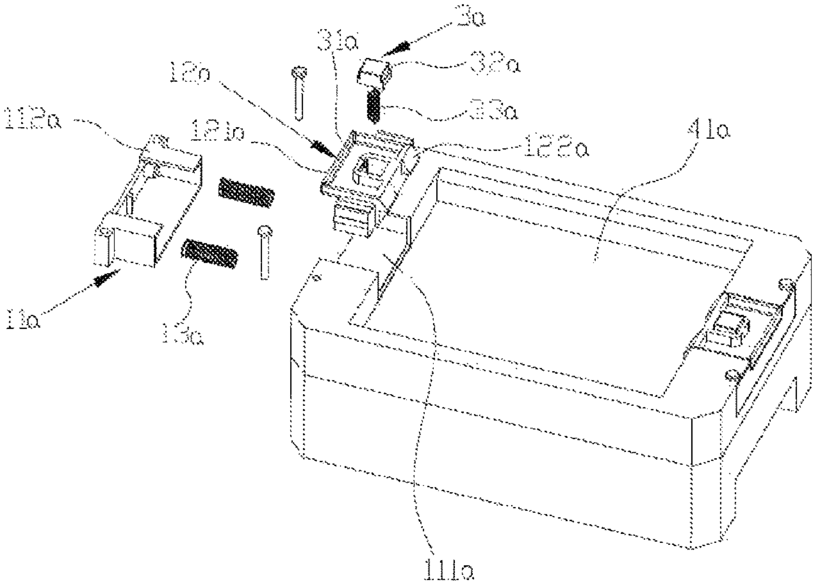
FIG. 23 shows the three-dimensional view of the bottom storage box of FIG. 17 viewed from the top with the locking mechanism in an exploded state.

Further, as shown in FIG. 23, in this embodiment, the mounting portion 11*a* is fixedly connected to the box lid. The mounting portion 11*a* includes a mounting slot 111*a* provided in the lid and a mounting body 112*a* located in the mounting slot 111*a*, which can be bolted in the mounting slot 111*a*. In other embodiments, the mounting body 112*a* may also be integrally formed with the mounting slot 111, or may be fixedly connected by means such as snap-on.

Further, as shown in FIG. 23, in this embodiment, the locking portion 12*a* may be housed within the mounting body 112*a*, which may be movable relative to the mounting body 112*a*, The locking portion 12*a* is a sliding latch that moves horizontally relative to the mounting portion 11*a*, thereby allowing the locking portion 12*a* to move horizontally within the mounting slot 111*a*. In other embodiments, the locking portion 12*a* may also be a flip latch that flips to move relative to the mounting portion 11*a*, or a rotary latch that rotates to move relative to the mounting portion 11*a*. The locking portion 12*a* includes a locking body 121*a* that can be accommodated in the mounting body 112*a* and a locking buckle 122*a* located on the side of the locking body 121*a* near the center of the storage box 20*a*; when the locking buckle 122*a* extends out of the mounting portion 11 a (i.e., the locking buckle 122*a* extends into the positioning slot 41*a*), the second locking mechanism 1*a* and the second locking bit 2*a* can be interlocked, and when the locking buckle 122*a* does not The second locking mechanism 1*a* and the second locking position 2*a* can be interlocked when the locking buckle 122*a* does not extend out of the mounting portion 11*a* (i.e., the locking buckle 122*a* does not extend into the positioning slot 41*a*). Also, to facilitate locking between the locking buckle 122*a* and the second locking bit 2*a*, the locking buckle 122*a* is provided with a bevel 122*aa*.

Further, as shown in FIG. 23, in this embodiment, the first elastic member 13*a* is located between the locking body 121*a* and the mounting body 112*a*, so that the locking portion 12*a* is automatically kept in the locked state by the action of the first elastic member 13*a*. At the same time, in order to improve the reliability of the movement of the locking part 12*a*, the first elastic member 13*a* can be provided with two, respectively located at the two ends of the locking body 121*a*. The first resilient member 13*a* is a compression spring, which causes the locking part 12*a* to move horizontally; in other embodiments, the first resilient member 13*a* may also be a torsion spring, which causes the locking part 12*a* to flip and move.

Figure 21:
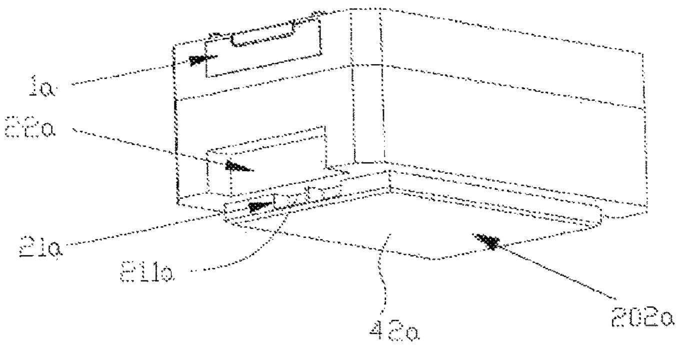
FIG. 21 is a three-dimensional view of the top storage box of FIG. 17 viewed from the bottom.

Further, as shown in FIG. 21, in this embodiment, the second locking position 2*a* is provided at the bottom of the box of the storage box 20*a*, which includes the mating part 21*a* that can be interlocked with the locking part 12*a* and the recessed part 22*a* that can be interlocked with the stopping part 3, and the locking part 12*a* of one storage box 20*a* can be automatically locked with the mating part 21*a* of another storage box 20*a* under the action of the first elastic member 13*a*. The first elastic member 13*a* is automatically locked. In addition, in order to facilitate the interlocking of the mating part 21*a* and the locking buckle 122*a*, a projection 42*a* (here the projection 42*a* is the bottom of the box) may be provided on the bottom of the box, and the projection 42*a* may fit just inside the positioning slot 41*a*. When the second locking mechanism 1*a* is in a locked state with the second locking bit 2*a*, the locking buckle 122*a* interferes with the mating part 21*a*; when the second locking mechanism 1*a* is in a holding unlocked state with the second locking bit 2*a*, the locking buckle 122*a* does not interfere with the mating part 21*a*, and the stopping part 3*a* snaps with the recessed part 22*a*, In other embodiments, when the second locking mechanism 1*a* is in a holding unlocked state with the second locking position 2*a*, the stop portion 3*a* can be directly held with the mating portion 21*a*. In addition, the mating part 21*a* is a number of slots 211*a*, and the number of slots 211*a* can be set corresponding to the number of locking buckles 122*a*.

Figure 17:
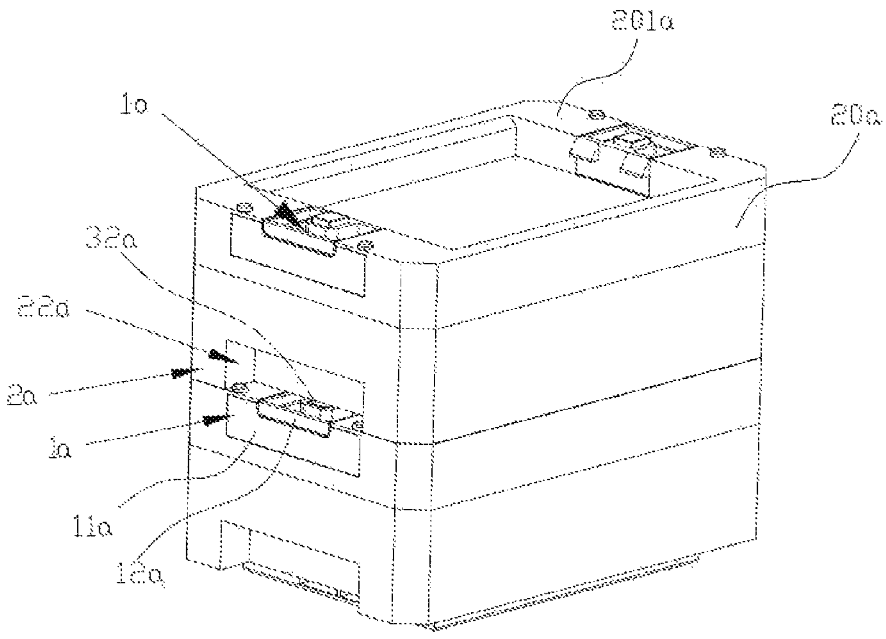
FIG. 17 is a schematic diagram of the three-dimensional structure of the storage boxes in a second embodiment of a second locking mechanism in the locked state.
Figure 18:
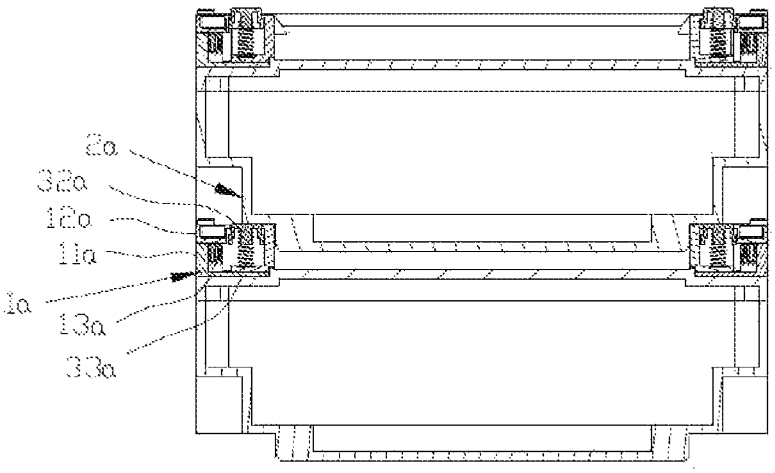
FIG. 18 is a cross-sectional view of FIG. 17.
Figure 19:
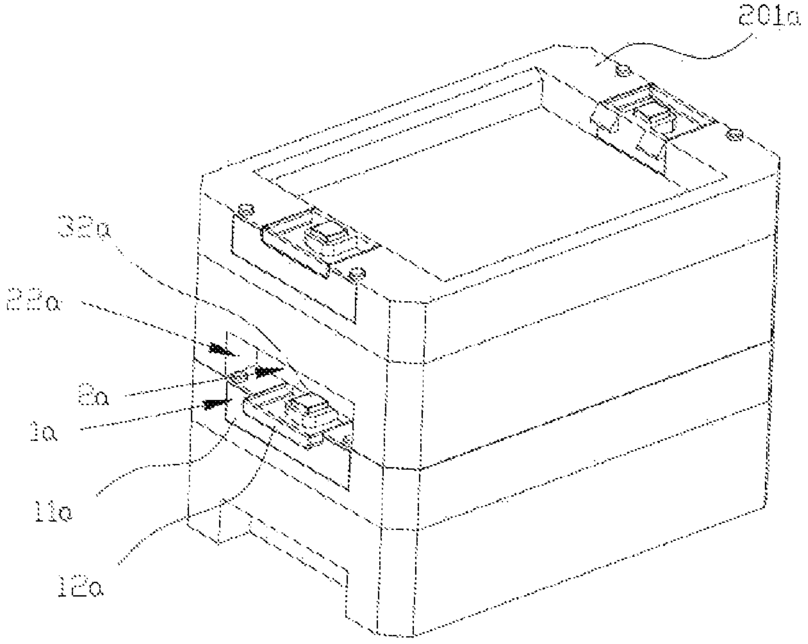
FIG. 19 is a three-dimensional view of the storage boxes of FIG. 17 in the unlocked state.
Figure 20:
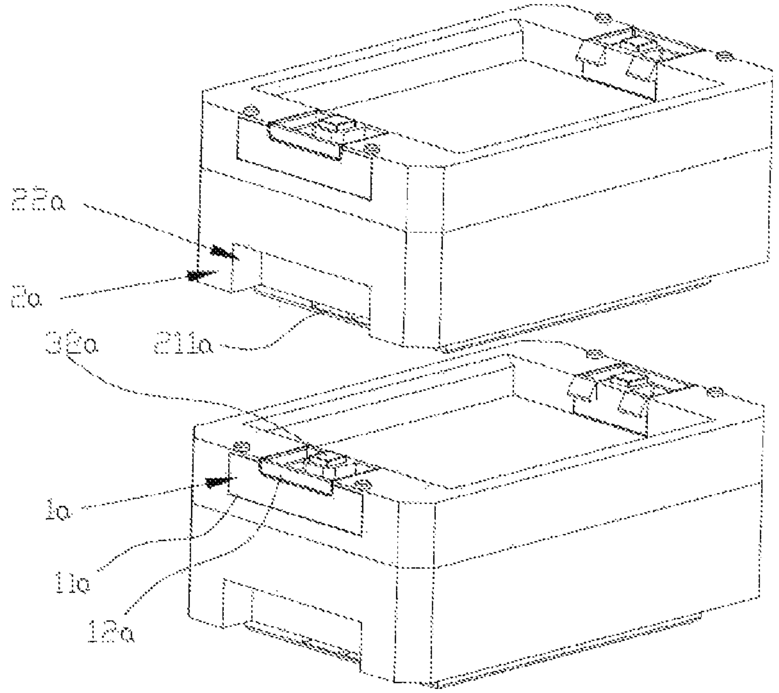
FIG. 20 is a three-dimensional view of the storage boxes of FIG. 17 separated from each other.
Figure 22:
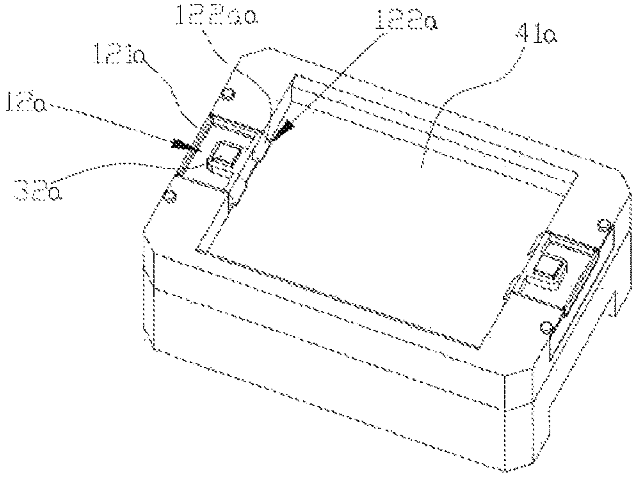
FIG. 22 is a three-dimensional view of the bottom storage box of FIG. 17 viewed from the top.

Further, as shown in FIG. 22 and FIG. 23, in this embodiment, the stop portion 3*a* is provided on the locking portion 12*a*, which can move horizontally with the locking portion 12*a*, and when the locking portion 12*a* is in the unlocked state, the stop portion 3*a* can snap with the second locking bit 2*a* in the locking path of the locking portion 12*a*, and the locking portion 12*a* cannot be automatically locked, so that the second locking mechanism 1*a* and the second locking bit 2*a* are in the remain unlocked. The stopping portion 3*a* includes a holding slot 31*a* opened on the locking portion 12*a*, a card block 32*a* that can be accommodated in the slot 31*a* and a second elastic member 33*a* disposed between the holding slot 31*a* and the card block 32*a*, and the card block 32*a* is retracted relative to the holding slot 31*a* under the action of the second elastic member 33*a*. Specifically, as shown in FIG. 19, when the second locking mechanism 1*a* and the second locking bit 2*a* are in a holding unlocked state, the second elastic member 33*a* extends and the card block 32*a* extends into the holding slot 31*a*; as shown in FIG. 17 and FIG. 18, when the second locking mechanism 1 a and the second locking bit 2*a* are in a locked state, the second elastic member 33*a* compresses and the card block 32*a* is squeezed and compressed by the second locking bit 2*a* in the holding slot 31*a*.

Third Embodiment

As shown in FIGS. 24-29, different from the above embodiment 1: the storage box 20*b* in this embodiment (which can be the main storage box and the secondary storage box in the above embodiment 1) also includes a stop portion 3*b*; the second locking mechanism 1*b* and the second locking bit 2*b* can be automatically locked with each other, and the stop portion 3*b* can make the second locking mechanism 1*b* and the second locking bit 2*b* unable to be automatically locked after unlocking, so that the second The second locking mechanism 1*b* and the second locking position 2*b* are kept in the unlocked state, so that the second locking mechanism 1*b* and the second locking position 2*b* can be unlocked and separated from each other, freeing the user's hands and facilitating the user's use.

Specifically, in this embodiment, the second locking mechanism 1*b* is provided on the lid (i.e., the first end 201*b*) of the storage box 20*b*, which includes a mounting part 11*b*, a locking part 12*b* movable relative to the mounting part 11*b* and a first elastic member 13*b* located between the mounting part 11*b* and the locking part 12*b*, and the locking part 12*b* can be automatically kept in the locked state under the action of the first elastic member 13*b*. In addition, as shown in FIGS. 18 and 19, to facilitate positioning of the second locking mechanism 1*b* when interlocked with the second locking bit 2*b*, a positioning slot 41*b* may be provided in the lid, which may be positioned with the projection 42*b* provided on the bottom of the box (i.e., the second end face 202*b*) for positioning of the upper and lower storage boxes 20*b* when stacked. In other embodiments, the positioning slot 41*b* may precisely accommodate the bottom of the box, and the second locking mechanism 1*b* may be provided at the edge of the positioning slot 41*b*.

Figure 25:
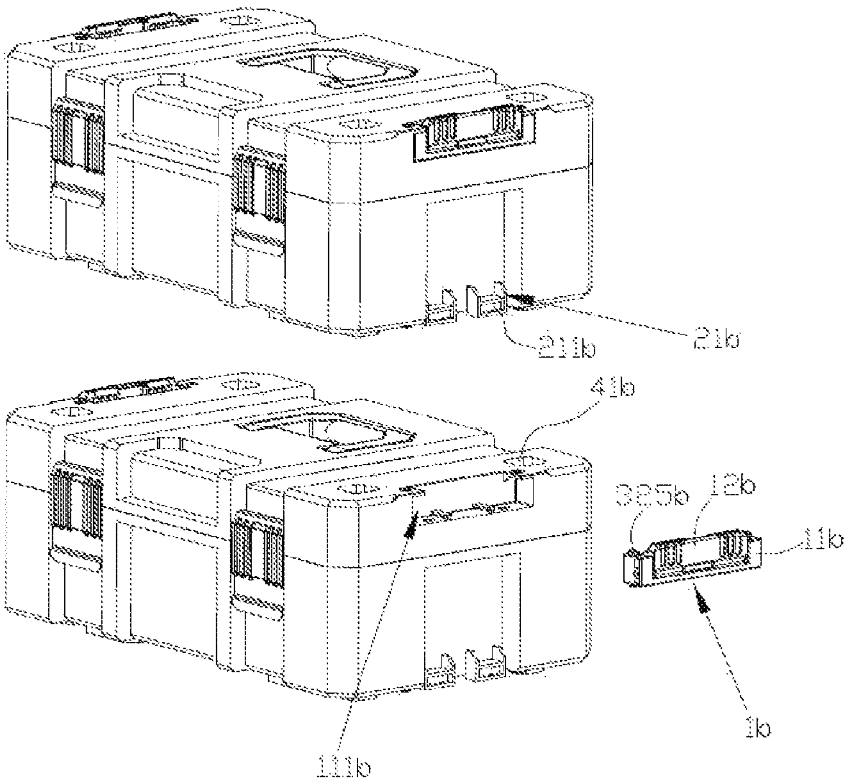
FIG. 25 is a schematic diagram of the third embodiment of the locking mechanism for storage boxes in a partially exploded view.

Further, as shown in FIG. 25, in this embodiment, the mounting portion 11*b* is fixedly connected to the box lid. The mounting section 11*b* includes a mounting slot 111*b* in the lid and a mounting body 112*b* located in the mounting slot 111*b*, which can be bolted in the mounting slot 111*b*. In other embodiments, the mounting body 112*b* may also be integrally formed with the mounting slot 111*b*, or may be fixedly connected by means such as snap-on.

Figure 27:
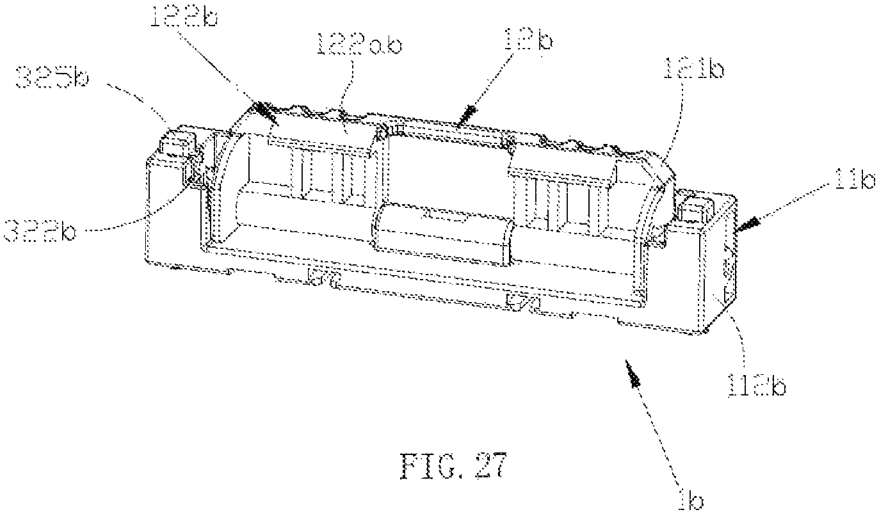
FIG. 27 is a schematic diagram of the structure of a first connection.
Figure 28:
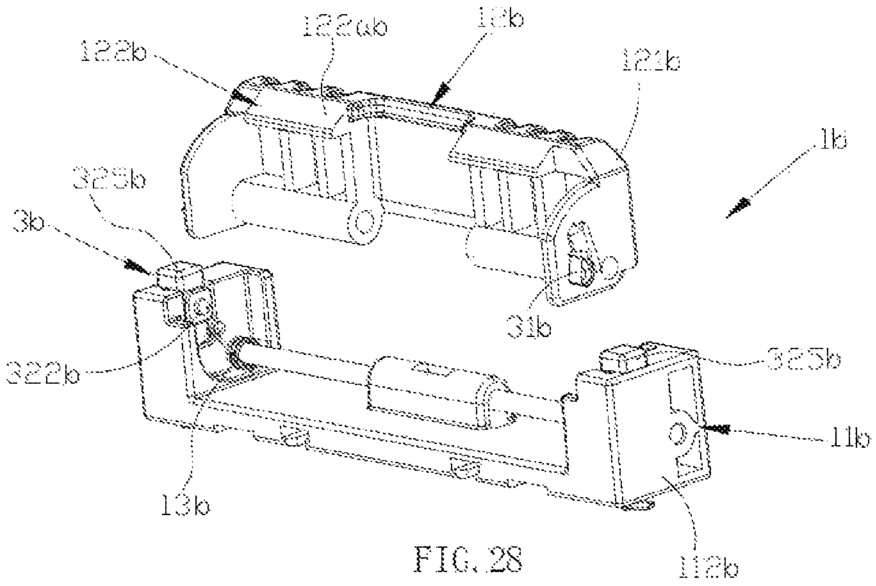
FIG. 28 is a schematic diagram of the exploded structure of FIG. 27 after further decomposition.
Figure 29:
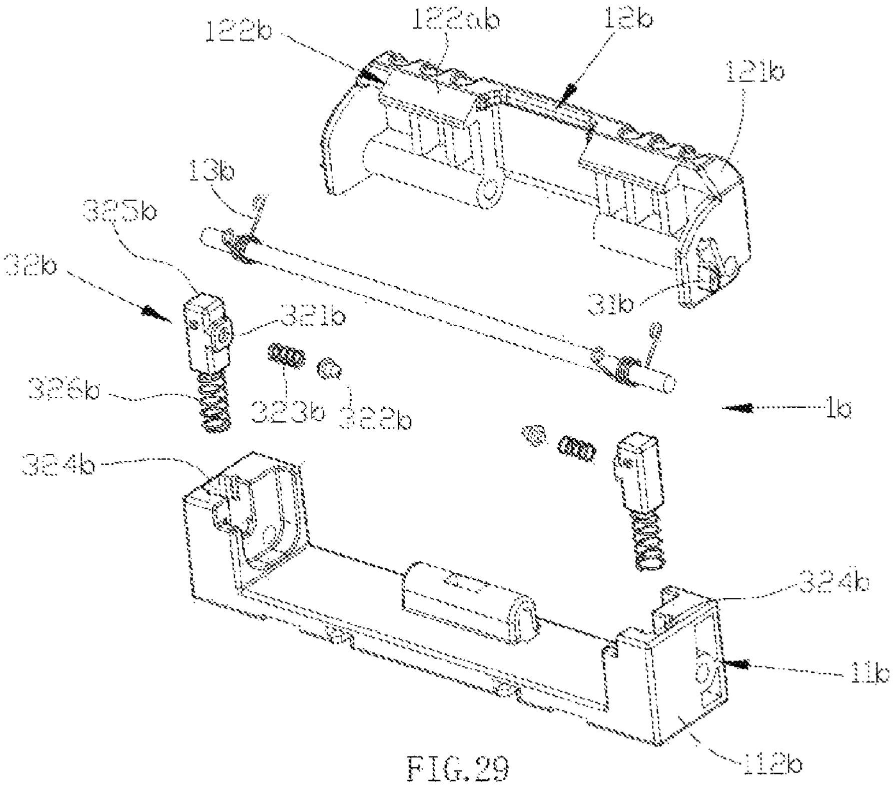
FIG. 29 is a schematic diagram of the exploded structure of FIG. 27 after even further decomposition.
Figure 30:
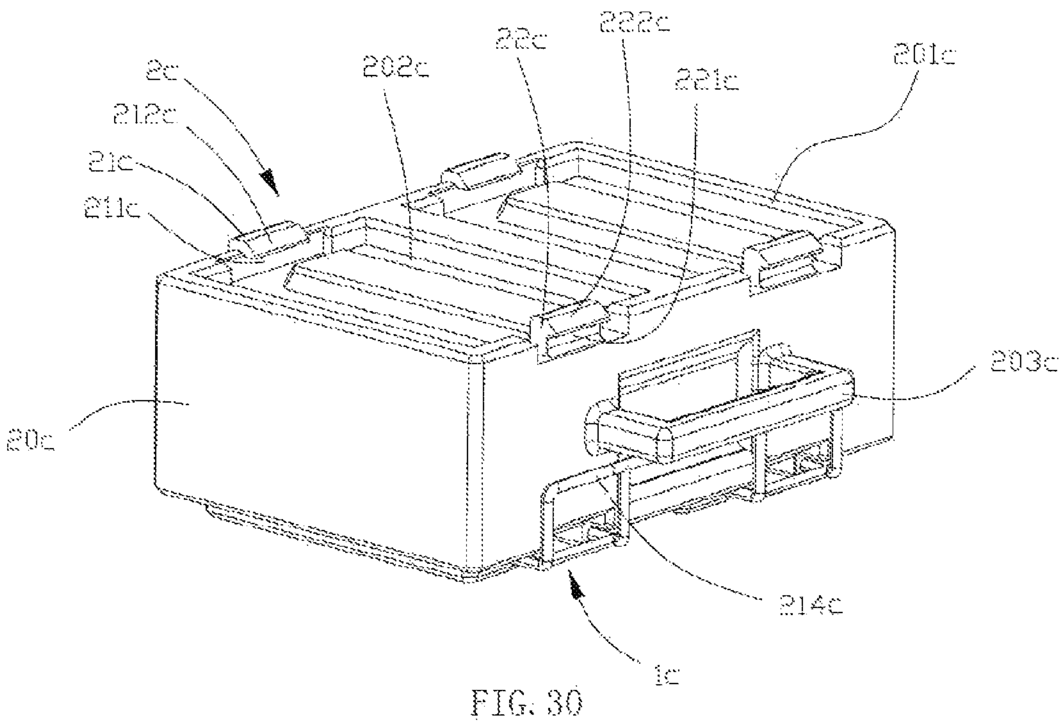
FIG. 30 is a schematic diagram of a three-dimensional structure of a storage box according to a fourth embodiment illustrating a linkage buckle for the second locking mechanism of the half-box of FIGS. 5-7.
Figure 31:
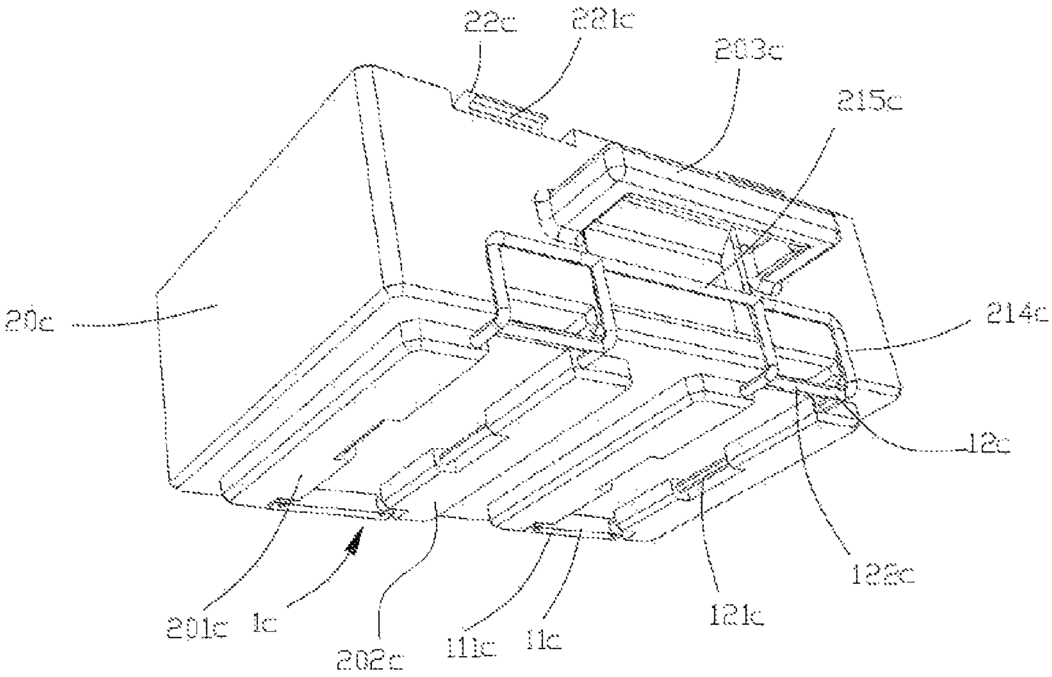
FIG. 31 is a schematic diagram of the bottom, front side of the storage box of FIG. 30.
Figure 32:
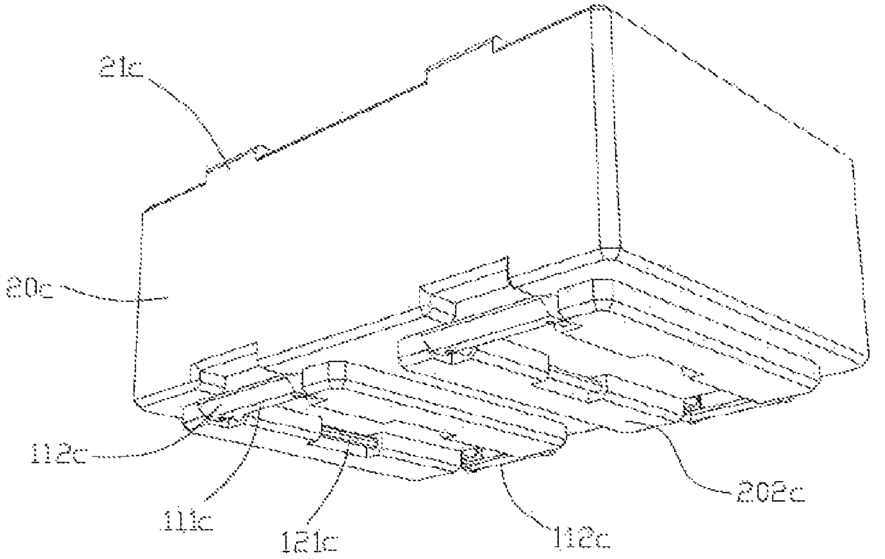
FIG. 32 is a schematic diagram of the bottom, back side of the storage box of FIG. 30.
Figure 33:
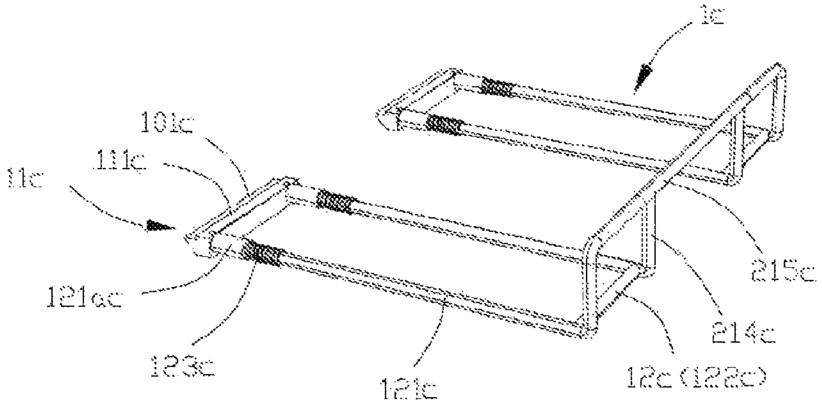
FIG. 33 is a schematic diagram of the locking buckle.
Figure 34:
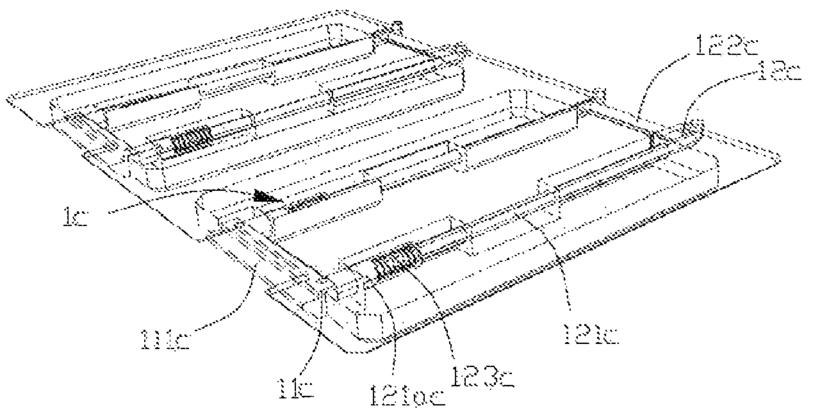
FIG. 34 is a schematic diagram of the locking transmission mechanism.
Figure 35:
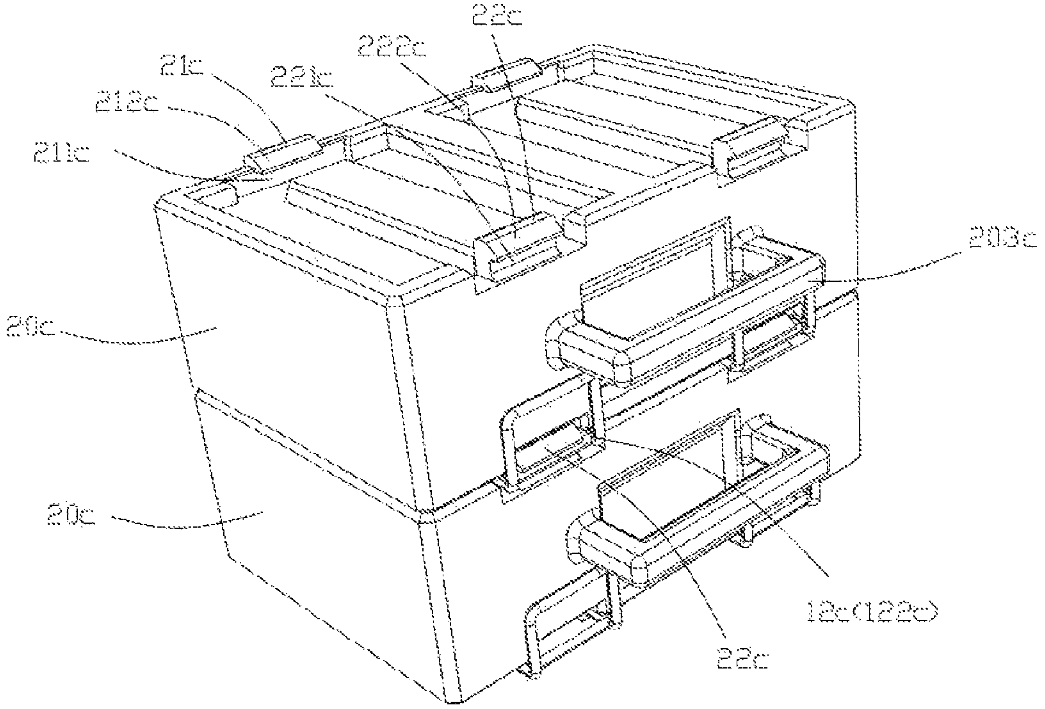
FIG. 35 is a schematic diagram of stacked storage boxes with the locking buckle.
Figure 36:
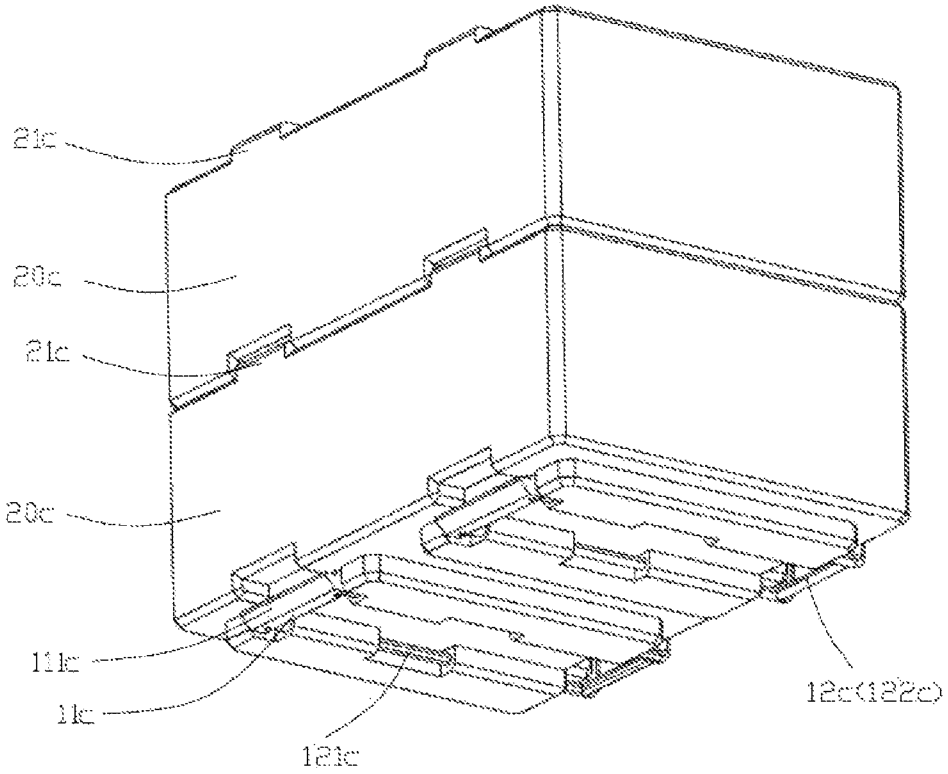
FIG. 36 is a rear-side view of the stacked storage boxes of FIG. 35.

Further, as shown in FIGS. 27 to 29, in this embodiment, the locking portion 12*b* may be housed within the mounting body 112*b*, which may be movable relative to the mounting body 112*b*. The locking portion 12*b* is a flip latch that flips and moves relative to the mounting portion 11 *b*, thereby allowing the locking portion 12*b* to flip and move within the mounting slot 111*b*. In other embodiments, the locking portion 12*b* may also be a sliding latch that moves horizontally relative to the mounting portion 11*b*, or a rotating latch that moves rotationally relative to the mounting portion 11*b*. The locking part 12*b* includes a locking body 121*b* rotatable around a rotating shaft (not marked) at one end and a locking clasp 122*b* located at the other end of the locking body 121*b* near the center of the storage box 20*b*; when the locking clasp 122*b* is extended into the second locking position 2*b*, the second locking mechanism 1*b* and the second locking position 2*b* can be interlocked, and when the locking clasp 122*b* is not extended into the second locking position 2*b*, the second The second locking mechanism 1*b* and the second locking position 2*b* can be interlocked when the locking buckle 122*b* is not extended into the second locking position 2*b*. Also, to facilitate locking between the locking buckle 122*b* and the second locking position 2*b*, the locking buckle 122*b* is provided with a bevel 122*ab*.

Further, as shown in FIG. 28 and FIG. 29, in this embodiment, the first resilient member 13*b* is provided on the rotating shaft, and its two ends are respectively abutted to the locking body 121*b* and the mounting body 112*b*, so that the locking part 12*b* is automatically kept in the locked state under the action of the first resilient member 13*b*. Meanwhile, in order to improve the reliability of the movement of the locking part 12*b*, the first elastic member 13*b* can be provided at both ends of the rotating shaft. The first resilient member 13*b* is a torsion spring, which causes the locking part 12*b* to move over; in other embodiments, the first resilient member 13*b* may also be a compression spring, which causes the locking part 12*b* to move horizontally.

Figure 24:
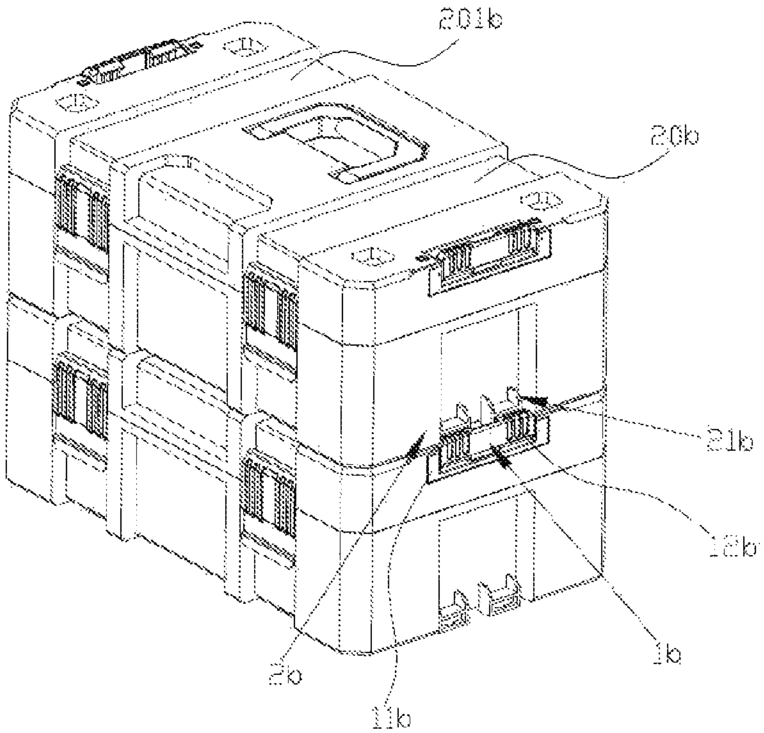
FIG. 24 is a schematic diagram of a third embodiment of a locking mechanism for storage boxes.
Figure 26:
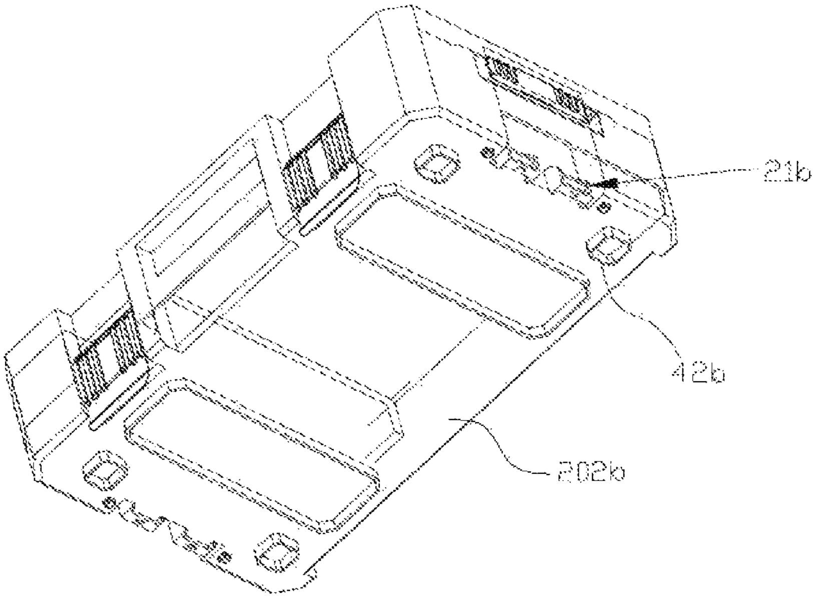
FIG. 26 is a bottom perspective view of the storage box of FIG. 24.

Further, as shown in FIGS. 24 to 26, in this embodiment, the second locking bit 2*b* is provided at the bottom of the box of the storage box 20*b*, which includes a mating part 21*b* that is interlockable with the locking part 12*b*, and pressing down on the locking part 12*b* of one module can make it automatically lock with the mating part 21*b* of the other module under the action of the first elastic member 13*b*. When the second locking mechanism 1*b* and the second locking bit 2*b* are in a locked state, the locking buckle 122*b* interferes with the mating part 21*b*; when the second locking mechanism 1*b* and the second locking bit 2*b* are in an unlocked state, the locking buckle 122*b* does not interfere with the mating part 21*b*. The mating part 21*b* is a number of slots 211*b*, and the number of slots 211*b* may be set corresponding to the number of locking buckles 122*b*.

Further, as shown in FIGS. 27 to 29, in this embodiment, the stop portion 3*b* includes a block 31*b* and a protrusion 32*b* that can be interlocked with the block 31*b*, and when the block 31*b* and the protrusion 32*b* are interlocked, the locking portion 12*b* cannot be automatically locked. Specifically, when the second locking mechanism 1*b* and the second locking bit 2*b* are in a holding unlocked state, the card block 31*b* and the convex rib 32*b* are stuck on the side of the convex rib 32*b* away from the center of the storage box 20*b*; when the second locking mechanism 1*b* and the second locking bit 2*b* are in a locked state, the card block 31*b* is located on the other side of the convex rib 32*b* near the center of the storage box.

Further, as shown in FIG. 28 and FIG. 29, in this embodiment, the card 31*b* is set on the locking part 12*b* of the second locking mechanism 1*b* and can move with the locking part 12*b*, and the convex rib 32*b* remains stationary compared with the card 31*b*, and the locking part 12*b* can drive the card 31*b* over the convex rib 32*b*. Specifically, the card 31*b* is set at both ends of the locking part 12*b*, and the card 31*b* can With the locking part 12*b* overturned to move between the two sides of the convex ribs 32*b*, so as to realize the second locking mechanism 1*b* and the second locking position 2*b* to switch between the locked state, the unlocked state and the keep unlocked state.

Further, as shown in FIG. 29, in this embodiment, the convex rib 32*b* is also provided on the second locking mechanism 1*b* and remains relatively stationary compared to the catch 31*b*, which includes a first holding slot 321*b* opened on the convex rib body 325*b*, a bump 322*b* that can be accommodated in the first holding slot 321*b* and a second resilient member located between the bump 322*b* and the first holding slot 321*b* 323*b*, the bump 322*b* being retractable relative to the first holding slot 321*b* under the action of the second resilient member 323*b*, so that after the card block 31*b* crosses the bump 322*b* the card block 31*b* can again snap with the bump 322*b* against each other, thereby keeping the second locking mechanism 1*b* in an unlocked state with the second locking position 2*b*. The protrusions 32*b* may be retractable relative to the card block 31*b*, for example, the protrusions 32*b* may be provided to be resilient to facilitate the card block 31*b* to be held after crossing the protrusions 32*b*. In other embodiments, the card block 31*b* may also be resilient, and the card block 31*b* may be provided with a resilient structure similar to the convex rib 32*b* (i.e., the second resilient member 323*b* is provided with the first holding slot 321*b*); or both the card block 31*b* and the convex rib 32*b* may be resilient; the convex rib 322*b* may be resilient without the second resilient member 323*b*, and the convex rib 322*b* may itself be a resilient material or be provided with a The cam 322*b* may be a resilient material itself or may be provided as a suspended structure. In other embodiments, the locking part 12*b* is a sliding latch, the block 31*b* is set on the locking part 12*b* of the second locking mechanism 1*b* and can move with the locking part 12*b*, and the protrusion 32*b* is set on the second locking bit 2*b* and remains stationary with respect to the block 31*b*.

Further, as shown in FIG. 29, in this embodiment, the cam 32*b* further includes a second holding slot 324*b* opened on the second locking mechanism 1 *b*, a cam body 325*b* that can be accommodated in the second holding slot 324*b* and a third elastic member 326*b* located between the cam body 325*b* and the second holding slot 324*b*, and the cam body 325*b* can, under the action of the third elastic member 326*b* The third elastic member 326*b* can be stretched relative to the second holding slot 324*b* by the action of the third elastic member 326*b*. When the third elastic member 326*b* is extended, the projection 322*b* is located above the card block 31*b*, and the projection 322*b* may not be held with the card block 31*b*; when the third elastic member 326*b* is compressed, the projection 322*b* is located at the same level as the card block 31*b* (or the projection 322*b* is located on the flip movement trajectory of the card block 31*b*), at which time the projection 322*b* may be held with the card block 31*b*, and the flip locking portion 12*b* can make the card block 31*b* stuck on the side of the convex rib 32*b* away from the center of the storage box 20*b* (i.e., remain in the unlocked state). Such a setting prevents misuse by the user while the two storage bins 20*b* are not yet stacked, i.e., it does not have a hold unlock function while the two storage bins 20*b* are not yet stacked. In other embodiments, the card block 31*b* may also be resilient by setting the card block 31*b* to a resilient structure similar to that of the convex ribbed body 325*b* (i.e., by setting the third resilient member 326*b* with the second holding slot 324*b*).

Fourth Embodiment

As shown in FIGS. 30-36, different from the above embodiment 1: the second locking mechanism 1*c* of the storage box 20*c* (which can be the secondary storage box in the above embodiment 1) in this embodiment is set on the third end face 201*c*, which includes the first locking buckle 11*c* and the second locking buckle 12*c* which is connected to the first locking buckle 11*c* by transmission, and the second locking buckle 12*c* can drive the first locking buckle 11*c* to move, thus The second locking buckle 12*c* can drive the first locking buckle 11*c* to move, so that the second locking buckle 12*c* and the first locking buckle 11*c* are simultaneously locked and unlocked with the second locking position 2*c*, thus enabling the interlocking function between two adjacent storage boxes 20*c*, which is convenient and fast.

The first locking buckle 11*c* has a first limiting member 111*c* protruding in the direction away from the second locking buckle 12*c*, and the first locking buckle 11*c* is provided in correspondence with the first snap hook 21*c* on the second locking position 2*c* set on the fourth end face 202*c*, and the first snap hook 21*c* can form the first slot 211*c*, so that the first limiting member 111*c* can extend into the first slot 211*c*. Specifically, when two storage bins 20*c* are stacked and provided, the first limiting member 111*c* of one of the storage bins 20*c* is embedded in the first slot 211*c* of the other storage bin 20*c*, thereby limiting the vertical displacement between the two storage bins 20*c*, thereby achieving interlocking between the two storage bins 20*c*. In other embodiments, the locking of the first limiting member 111*c* with the first slot 211*c* may also limit both vertical and horizontal displacements between the two lockers 20*c*. In this embodiment, the first slot 211*c* is formed on the first snap hook 21*c*, but the structure forming the first slot 211*c* is not limited thereto. The first limiting member 111*c* is provided with a first guiding ramp 112*c* and the first snap hook 21*c* is provided with a second guiding ramp 212*c*, thereby facilitating the first limiting member 111*c* to slide into the first slot 211*c*. In this embodiment, the number of first locking clasps 11*c* corresponds to the number of second locking clasps 12*c*; in other embodiments, multiple first locking clasps 11*c* may also be provided.

The second locking buckle 12*c* is a horizontal sliding buckle, and drive the first locking buckle 11*c* for horizontal movement; specifically, a second locking buckle 12*c* can drive at least one first locking buckle 11*c* and the second locking bit 2*c* lock and unlock each other, so as to easily and quickly achieve the interlocking function between the two storage boxes 20*c*, convenient for stacking and rapid separation between multiple storage boxes 20*c*. In this embodiment, the number of first locking buckle 11*c* corresponds to the number of second locking buckle 12*c*; in other embodiments, a second locking buckle 12*c* can also be set to drive a plurality of first locking buckle 11*c* to move at the same time; when a second locking buckle 12*c* drives a plurality of first locking buckle 11*c* to move, because a plurality of first locking buckle 11*c* makes horizontal movement, therefore, a plurality of first locking buckle 11*c* is not limited to be set at the edge position of the storage box 20*c*, it can be set at the middle position of the storage box 20*c*, so that the locking between the storage box 20*c* is more solid and reliable. In other embodiments, the second locking buckle 12*c* is a flip buckle and drives the first locking buckle 11*c* for horizontal movement; or the first locking buckle 11*c* is also a flip buckle, and the second locking buckle 12*c* drives the first locking buckle 11 for flip movement.

The second locking buckle 12*c* includes a drive part 121*c*, a second limiting member 122*c* connected to the drive part 121*c* and a resilient member 123*c*. The second locking buckle 12*c* has a first position interlocked with the second locking position 2*c* and a second position interlocked with the second locking position 2*c*; when the second locking buckle 12*c* is in the first position, the second locking buckle 12*c* drives the first locking buckle 11*c* to interlock with the second locking position 2*c*. the second locking buckle 12*c* drives the first locking buckle 11*c* to interlock with the second locking position 2*c* when the second locking buckle 12*c* is in the second position and the second locking buckle 12*c* drives the first locking buckle 11*c* to interlock with the second locking position 2*c* when the second locking buckle 12*c* is in the second position.

The drive member 121*c* is a rigid or soft material, which may be provided in an elongated structure and extend along the length of the bottom. In other embodiments, drive member 121*c* may also be a rigid or soft, thickly shaped, curved structure. The drive member 121*c* is disposed between the first locking clasp 11*c* and the second locking clasp 12*c* such that the second locking clasp 12*c* can control the movement of the first locking clasp 11*c* via the drive member 121*c*. Further, the transmission member 121*c* is provided with a connecting part 121*ac*, and the diameter of the connecting part 121*ac* is larger than the diameter of the transmission member 121*c*, so that one end of the resilient member 123*c* is held against the connecting part 121*ac*. In this embodiment, the number of transmission members 121*c* is two and side by side, and the first locking buckle 11*c* is fixed on the connecting part 121*ac* of the two transmission members 121*c*, so as to enhance the stability of the first locking buckle 11*c* sliding. In other embodiments, multiple transmission members 121*c* may be provided; the transmission structure 121*c* may also be a gear transmission structure, a belt transmission structure, etc.

The second limiting member 122*c* is a rod-like structure, which can be interlocked with the second locking position 2*c*; specifically, the second limiting member 122*c* is located at one end of the two transmission members 121*c*, and the second limiting member 122*c* is connected between the two transmission members 121*c*, which is provided in correspondence with the second snap hook 22*c* on the second locking position 2*c*, and the second snap hook 22*c* can form the second slot 221*c*, so that the second limiting member 122*c* can extend into the second slot 221*c*. Specifically, when two storage bins 20*c* are stacked, the second limiting member 122*c* of one of the storage bins 20*c* is embedded in the second slot 221*c* of the other storage bin 20*c*, thereby further limiting the vertical displacement between the two storage bins 20*c*, and the two storage bins 20*c* have two fixing points between the front and rear, for better fixing effect. In other embodiments, the locking of the second limiting member 122*c* with the second slot 221*c* may also limit both vertical and horizontal displacement between the two storage bins 20*c*. In this embodiment, the second slot 221*c* is formed on the second snap hook 22*c*, but the structure forming the second slot 221*c* is not limited to this. The second snap hook 22*c* is provided with a third guide ramp 222*c*, thereby facilitating the second limiting member 122*c* to slide into the second slot 221*c*.

One end of the resilient member 123*c* abuts against the second locking mechanism 1*c* and the other end abuts against the storage box 20*c*. In this embodiment, one end of the resilient member 123*c* abuts against the attachment portion 121*ac* on the drive member 121*c* and the other end abuts against the storage box 20*c*. In other embodiments, one end of the resilient member 123*c* may also be abutted against the first locking clasp 11*c*. Specifically, the resilient member 123*c* can make the drive member 121*c* of the second locking buckle 12*c* automatically located in the first position to keep the first locking buckle 11c automatically in the locked state, the drive member 121c moved to the second position by external force, the drive member 121c drive the first locking buckle 11c into the unlocked state. The resilient member 123c, such as a spring, the resilient member 123c is set on the transmission member 121c and one end is connected to the connection 121ac, and the other end of the resilient member 123c is connected to the storage box 20c, and the second locking buckle 12c is automatically fixed in the first position by the elastic force of the resilient member 123c, so as to realize the automatic locking of the first locking buckle 11c and the second locking buckle 12c.

Further, the second locking buckle 12c also includes a tie bar 124c that can be connected to a plurality of transmission members 121c, in this embodiment, the tie bar 214c is provided at one end of the two transmission members 121c away from the connecting part 121ac and connected to the two transmission members 121c. The lever 214c is used to allow the user to pull the drive members 121c to unlock the first locking buckle 11c. In other embodiments, a plurality of pull rods 214c may be provided.

Further, the second locking buckle 12c also includes a connecting rod 215c that can connect a plurality of rods 214c. In this embodiment, the connecting rod 215c is set between the rods 214c of the two second locking buckles 12c and can drive a plurality of rods 214c to move; when the number of second locking buckles 12c is two and set side by side, the two rods 214c are connected to each other by the connecting rod 215c. The storage box 20c corresponding to the position of the connecting rod 215c is provided with avoidance groove, pulling the connecting rod 215c can move the transmission member 121c, so that pulling the connecting rod 215c can simultaneously control the movement of the two second locking buckle 12c. In this embodiment, the locker 20c is also provided with a handheld section 203c. The handheld section 203c is provided on the same side as the rod 215c to facilitate the user to lift the locker 20c while unlocking it. in other embodiments, the rod 215c can also be used as the handheld section 203c to simplify the design and achieve multiple uses of the rod 215c.

The technical features of the above described embodiments can be combined in any number of ways. For the sake of brevity of description, not all possible combinations of the technical features of the above described embodiments are described, however, as long as the combinations of these technical features are not contradictory, they should be considered to be within the scope of the present specification.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A main storage box comprising:

a first box body having a first end face and two spaced apart second locking mechanisms symmetrically along a first direction on opposing edges of said first end face forming a second locking gap in said first direction; and at least one first locking mechanism on said first end face between said two spaced apart second locking mechanisms, with the at least one first locking mechanism set opposite to at least one of the two second locking mechanism in the first direction to form at least one first locking gap in said first direction between the at least one first locking mechanism and at least one of the two spaced apart said second locking mechanisms, wherein the at least one first locking mechanism is inwardly spaced from each edge of the first end face.

2. The main storage box of claim 1, wherein the at least one first locking mechanism comprises a first snap hook being movably mounted in said first box so as to enable the at least one first locking mechanism to form said at least one first locking gap with at least one of the two spaced apart second locking mechanism.

3. The main storage box of claim 2, wherein the at least one first locking mechanism further comprises a first recess in the first end face having opposite side walls and a first connection shaft, wherein the first snap hook further comprises corresponding mounting holes on opposite sides thereof to receive first connection shaft so that the first snap hook is pivotally mounted on the first connection shaft to move relative to the first recess such that in an upward position the first snap hook protrudes from the first recess to form said at least one first locking gap with at least one of the two spaced apart second locking mechanisms and in a downward position the first snap hook is concealed in the first recess.

4. The main storage box of claim 3, wherein the first snap hook further comprises a back wall and an top wall connected perpendicular thereto such that when the first snap hook is in the downward position the back wall of the first snap hook is flush with a portion of the first end face.

5. The main storage box of claim 2, wherein said first end face is provided with a first recess, one end of said first snap hook being movably mounted in said first recess to enable the other end of said first snap hook to protrude or be housed in said first recess; wherein the at least one first locking mechanism is capable of forming the at least one first locking gap with at least one of the two spaced apart second locking mechanism when the other end of said first snap hook protrudes from said first recess.

6. The main storage box of claim 2, further comprising two said first locking mechanisms, each of said first locking mechanisms facing opposite of each other and towards one of said two second locking mechanism to form said first locking gap therebetween.

7. The main storage box of claim 2, further comprising two first snap hooks facing in opposite directions, said first locking mechanism being movably mounted in said first box so that said first locking mechanism can form two said first locking gaps with two said second locking mechanisms.

8. The main storage box of claim 7, wherein both said first snap hooks are simultaneously reversible towards a third direction normal to the first end face.

9. The main storage box according to claim 8, further comprising a first recess in the first end face, one end of said first snap hook being movably mounted in said first recess so that the other end of said first snap hook can extend or be accommodated in said first recess, wherein one of said first snap hook being capable of forming said first locking gap with one said second locking mechanism when the first snap hook protrudes from said first recess.

10. The main storage box of claim 1, wherein each said second locking mechanisms comprises a second recess opened in said first face of said main storage box, a second attachment shaft fixed in said second recess and a second snap hook rotatably connected to said second attachment shaft, said second locking mechanism being lockable by rotation of said second snap hook.

11. The main storage box of claim 10, wherein each of said second locking mechanism further comprises a resilient member and a stop, said resilient member keeping said second locking mechanism automatically in a locked state and said stop keeping said second locking mechanism from automatically locking and in the held unlocked state.

12. The main storage box of claim 11, wherein each said stop is retractable, which is provided on said second snap hook and is movable with said second snap hook; said stop extends in a locking path of the second locking mechanism when said second locking mechanism is in a holding unlocked state, and said stop compresses when said second locking mechanism is in a locked state.

13. The main storage box of claim 12, wherein said stop comprises a card block and a convex prong with which the card block is interlocked, said card block being set on said second hook and movable with the second hook, said convex prong remaining stationary compared to the card block; said card block being interlocked with the convex prong on a side of the convex prong away from said first locking mechanism when said second locking mechanism is in a holding unlocked state, said card block being located on the other side of the convex prong near the first locking mechanism when said second locking mechanism is in a locked state.

14. The main storage box of claim 1, wherein each of said second locking mechanism comprises a second recess opened in the main storage box, a rail fixed to a bottom wall of said second recess, and a second snap hook capable of moving within said rail, said second locking mechanism being lockable by sliding of said second snap hook.

15. The main storage box of claim 14, wherein each said second locking mechanism further comprises a resilient member and a stop, said resilient member keeping said second locking mechanism automatically in a locked state and said stop keeping said second locking mechanism from automatically locking and in the held unlocked state.

16. The main storage box of claim 15, wherein said stop is retractable, which is provided on said second snap hook and is movable with said second snap hook; said stop extends in a locking path of the second locking mechanism when said second locking mechanism is in a holding unlocked state, and said stop compresses when said second locking mechanism is in a locked state.

17. The main storage box of claim 16, wherein said stop comprises a card block and a convex prong with which the card block is interlocked, said card block being set on said second hook and movable with the second hook, said convex prong remaining stationary compared to the card block; said card block being interlocked with the convex prong on a side of the convex prong away from said first locking mechanism when said second locking mechanism is in a holding unlocked state, said card block being located on the other side of the convex prong near the first locking mechanism when said second locking mechanism is in a locked state.

18. The main storage box of claim 1, wherein said first box body has a second end face relative to said first end face, said second end face having two second locking bits opened at the edges for cooperating with said second locking mechanism, the two said second locking bits being spaced along said first direction.

19. A storage box system, comprising:

a main storage box comprising:

a first box body having a first end face and two spaced apart second locking mechanisms symmetrically along a first direction on opposing edges of said first end face forming a second locking gap in said first direction; and at least one first locking mechanism on said first end face between said two spaced apart second locking mechanisms, with the at least one first locking mechanism set opposite to at least one of the two second locking mechanism in the first direction to form at least one first locking gap in said first direction between the at least one first locking mechanism and at least one of the two spaced apart said second locking mechanisms;

wherein the at least one first locking mechanism is inwardly spaced from each edge of the first end face; and a secondary storage box comprising:

a third end face, at least one second locking mechanism provided on said third end face; and a third locking mechanism provided opposite to said second locking mechanism, said second locking mechanism and said third locking mechanism forming a third locking gap is between said second locking mechanism and said third locking mechanism.

20. The storage box system of claim 19, wherein the second locking mechanism of the secondary storage box is drive connected to said third locking mechanism, said second locking mechanism can drive said third locking mechanism to unlock and lock at the same time.

21. The storage box system of claim 19, wherein said secondary storage box further comprises a fourth end face opposite said third end face, said fourth end face being provided with a second locking position opposite said second locking mechanism and a first locking position opposite said third locking mechanism.

22. The storage box system of claim 19, wherein the main storage box being capable of being stacked and locked with at least one said secondary storage box on top of each other when one said main storage box is stacked on top of and locked in place with one said secondary storage box, said first locking mechanism of said main storage box snaps into said first locking position of said secondary storage box, and said second locking mechanism of said main storage box snaps into said second locking position of said secondary storage box so that said secondary storage box is confined in said at least one first locking gap.

23. The storage box system of claim 19, wherein the main storage box has a plurality of recessed portions opened on said first end face and a plurality of tabs opened on said second end face; and said secondary storage box has a plurality of said recessed portions opened on said third end face and said secondary storage box has a plurality of said tabs opened on said fourth end face, each said tab being capable of being confined in a said each of said tabs being able to be confined in one of said recesses to prevent relative movement between one of said main storage boxes stacked on top of each other and said secondary storage bins.

24. The storage box system of claim 19, wherein the third locking mechanism of the secondary storage box comprises a snap hook being movably mounted in said third end face so as to enable one said third locking mechanism to form said third locking gap with one said second locking mechanism.

* * * * *